(12) United States Patent
Li et al.

(10) Patent No.: US 9,160,847 B2
(45) Date of Patent: Oct. 13, 2015

(54) VISUAL TRANSLATION FOR AN IVR SYSTEM

(71) Applicants: Zhuangzi Li, Flushing, NY (US); Franklin M. Schellenberg, Palo Alto, CA (US)

(72) Inventors: Zhuangzi Li, Flushing, NY (US); Franklin M. Schellenberg, Palo Alto, CA (US)

(*) Notice: Subject to any disclaimer, the term of this patent is extended or adjusted under 35 U.S.C. 154(b) by 0 days.

(21) Appl. No.: 14/307,921

(22) Filed: Jun. 18, 2014

(65) Prior Publication Data

US 2015/0004948 A1 Jan. 1, 2015

Related U.S. Application Data

(63) Continuation of application No. 13/999,196, filed on Jan. 27, 2014.

(60) Provisional application No. 61/840,190, filed on Jun. 27, 2013.

(51) Int. Cl.
| | |
|---|---|
| *H04M 1/27* | (2006.01) |
| *H04M 3/44* | (2006.01) |
| *H04W 4/20* | (2009.01) |
| *H04M 3/493* | (2006.01) |
| *H04W 4/16* | (2009.01) |

(52) U.S. Cl.
CPC ............. *H04M 3/4931* (2013.01); *H04W 4/16* (2013.01); *H04W 4/20* (2013.01)

(58) Field of Classification Search
USPC ............. 379/201.01, 207.02, 216.01, 218.01, 379/355.01–357.05; 455/414.1
See application file for complete search history.

(56) References Cited

U.S. PATENT DOCUMENTS

| | | |
|---|---|---|
| 5,802,526 A | 9/1998 | Fawcett et al. |
| 7,215,743 B2 | 5/2007 | Creamer et al. |
| 7,551,899 B1 | 6/2009 | Nicolas et al. |
| 7,680,513 B2 | 3/2010 | Haitani et al. |
| 7,710,293 B2 | 5/2010 | Kallqvist |
| 8,000,454 B1 | 8/2011 | Or-Bach et al. |
| 8,019,057 B2 | 9/2011 | Sharma |
| 8,050,720 B2 | 11/2011 | Tsui |
| 8,054,952 B1 | 11/2011 | Or-Bach et al. |
| 8,078,205 B2 | 12/2011 | James |

(Continued)

OTHER PUBLICATIONS

Dave Roos, "How Interactive Voice Response (IVR) Works" Feb. 20, 2008. HowStuffWorks.com. < http://electronics.howstuffworks.com/interactive-voice-response.htm >, Downloaded as PDF Jan. 19, 2014.

(Continued)

*Primary Examiner* — Harry S Hong
(74) *Attorney, Agent, or Firm* — Franklin Schellenbeng

(57) ABSTRACT

The invention is a method of creating a dialstring for use with mobile smartphones and other computer-enabled telephones. A software app designed to implement the method recognizes input from the user that identifies an organization to be called, and accesses a stored representation of a corresponding IVR phone tree. The app then presents a graphical representation of all or part of the phone tree on the display of the telephone in a language that is different than the language used in the phone tree. The user can then respond by providing selective inputs that cause the app to synthesize all or part of the dialstring needed to navigate the phone tree to the desired destination. Once a dialing option has been synthesized to the user's satisfaction, the user may provide additional input that the system interprets as an instruction to open a phone call and dial the synthesized number.

16 Claims, 21 Drawing Sheets

(56) References Cited

U.S. PATENT DOCUMENTS

| | | |
|---|---|---|
| 8,085,922 B1 | 12/2011 | Smith et al. |
| 8,155,280 B1 | 4/2012 | Or-Bach et al. |
| 8,160,215 B2 | 4/2012 | Or-Bach et al. |
| 8,214,762 B2 | 7/2012 | Pai |
| 8,223,931 B1 | 7/2012 | Lavian et al. |
| 8,280,913 B2 | 10/2012 | Bergin |
| 8,290,125 B2 | 10/2012 | Grigsby et al. |
| 8,300,634 B2 | 10/2012 | Nerayanaswamy et al. |
| 8,340,969 B2 | 12/2012 | Malo et al. |
| 8,345,835 B1 | 1/2013 | Or-Bach et al. |
| 8,401,171 B1 | 3/2013 | Nunez, III |
| 8,406,388 B2 | 3/2013 | Or-Bach et al. |
| 8,442,429 B2 | 5/2013 | Hawit |
| 8,477,924 B2 | 7/2013 | Venkataraman |
| 8,494,126 B2 | 7/2013 | Skinner |
| 8,520,830 B2 | 8/2013 | Singh et al. |
| 8,537,989 B1 | 9/2013 | Lavian et al. |
| 8,542,814 B1 | 9/2013 | Smith et al. |
| 8,548,131 B1 | 10/2013 | Lavian et al. |
| 8,548,135 B1 | 10/2013 | Lavian et al. |
| 8,553,859 B1 | 10/2013 | Lavian et al. |
| 8,553,868 B2 | 10/2013 | Smelyansky |
| 8,565,388 B2 | 10/2013 | Mittal |
| 8,572,303 B2 | 10/2013 | Lavian et al. |
| 8,594,280 B1 | 11/2013 | Or-Bach et al. |
| 8,625,756 B1 | 1/2014 | Lavian et al. |
| 8,634,521 B2 | 1/2014 | Grigsby et al. |
| 8,681,951 B1 | 3/2014 | Lavian et al. |
| 8,687,777 B1 | 4/2014 | Lavian et al. |
| 8,717,915 B2 | 5/2014 | Dubut et al. |
| 8,731,148 B1 | 5/2014 | Lavian et al. |
| 2003/0174833 A1* | 9/2003 | Wang .................. 379/419 |
| 2009/0164783 A1* | 6/2009 | Solis et al. .......... 713/168 |
| 2010/0087175 A1 | 4/2010 | Roundtree |
| 2011/0229869 A1 | 9/2011 | Lee |
| 2013/0022191 A1 | 1/2013 | Or-Bach et al. |
| 2013/0042204 A1 | 2/2013 | Derks |
| 2013/0080898 A1 | 3/2013 | Lavian et al. |
| 2013/0251126 A1 | 9/2013 | Hollander et al. |
| 2013/0272510 A1 | 10/2013 | Mittal |
| 2013/0272514 A1 | 10/2013 | Dragushan |
| 2014/0134979 A1 | 5/2014 | Sen et al. |
| 2014/0226805 A1* | 8/2014 | Li .................. 379/207.02 |

OTHER PUBLICATIONS

M. Amodio, "IVR +Mobile Apps= Visual IVR for Customer Happiness", Oct. 5, 2012 < http://technews.tmcnet.com/ >, Downloaded as PDF Jan. 19, 2014.

Jonathon Keats, "Many Happy Returns: A Handy Guide to Retail Phone Menus", Wired Magazine 22.01, p. 68 (Jan. 2014).

"What is Visual IVR" < http://www.visual-ivr.com/what-is-visual-ivr/ > Website of Jacada Inc. Downloaded as PDF Jan. 19, 2014.

"The ChoiceView Visual IVR" < http://www.radishsystems.com/products/choiceview-visual-ivr/> Website of Radish Systems Inc. Downloaded as PDF Jun. 20, 2014.

"VisuMenu Features" < http://www.visumenu.com/features/ > and "About Us" < http://www.visumenu.com/about-us/ > Website of VisuMenu Systems Inc. Downloaded as PDF Jun. 20, 2014.

* cited by examiner

VISUAL TRANSLATION FOR AN IVR SYSTEM

CROSS-REFERENCE TO RELATED APPLICATIONS

This Patent application is a continuation of U.S. patent application Ser. No. 13/999,196 entitled METHOD FOR VISUALIZING AN IVR SYSTEM filed Jan. 27, 2014, and also claims the benefit of U.S. Provisional Patent Application No. 61/840,190, filed on Jun. 27, 2013, which is incorporated herein by reference in its entirety.

FIELD OF THE INVENTION

This invention relates to making phone calls, and more specifically, provides a method for pre-programming a dialing sequence, or dialstring, to allow more rapid connection to the desired destination at an organization or company employing an interactive voice response (IVR) system. The method, typically implemented in software as a application (or "app") on a smartphone with a touchscreen display, recognizes the intention of the user to make a call to an organization from user inputs, and responds by presenting a graphical representation of all or part of the destination IVR phone tree on the display of the user's device. The user can then select the desired destination in the IVR tree through interaction with the display. Once selected, the method then creates a dialing sequence that is then dialed upon appropriate user input. In some embodiments, the dialing sequence is created after the user selects a single input from the display. In some embodiments, the dialing sequence is built up through multiple interactions with the system through the display.

BACKGROUND OF THE INVENTION

Since the 1960s, automated interactive voice response (IVR) systems have been developed and are now widely employed by organizations and companies to direct calls coming in to the organization. The typical IVR system plays a pre-programmed greeting that presents options to the user, such as "Welcome to Conglomerate Industries. Press or say 1 for customer service, 2 for technical support," . . . etc., and then waits for a response from the user. User input can be provided from entering a number on the phone, which triggers the generation of a touch tone (dual-tone multi-frequency (DTMF) signaling) signal, or by speaking the response. The IVR system then attempts to recognize the input, and switch the call to the designated destination.

Often, the destination will again have a pre-programmed IVR response, such as "Welcome to Conglomerate customer service. Press or say 1 for computer products, 2 for telephone products, . . . " etc. and the user again must enter or say an option. This third destination may yet again have a pre-recorded IVR response, which may even lead to a fourth destination with a pre-programmed IVR response.

FIG. 1 illustrates the options presented in a phone tree for a representative IVR system, in this case, that of the United States Citizenship and Immigration Service (USCIS). The Top Tier 001 represents dialing the 800 number (1-800-375-5283). The $1^{st}$ Tier of options 011 represents the two options that are presented once the system at the USCIS answers the phone call, namely an option for proceeding in English or in Spanish. Once the user selects one of these options (which, for the purpose of this illustration, will be assumed to be in English), the $2^{nd}$ Tier 021 represents the seven options that are presented once the language selection has been made. Likewise, once the user selects one of these $2^{nd}$ Tier 021 options, various $3^{rd}$ Tier 031 options are available, and upon selecting one of these $3^{rd}$ Tier options, various $4^{th}$ Tier 041 options may be available, depending on the selection, etc.

When a caller wishes to interact with the USCIS, the caller would typically dial 1-800-375-5283, wait for the reply, then press 1 (or 2), then wait for a reply, then press the next response, etc.

When an IVR system works well, it can direct the caller quickly to the destination desired, while saving costs for companies and organizations by allowing them to employ fewer human operators while still "handling" large call volumes. IVR systems are now a business service sector with revenues of almost $2B annually, and several companies provide software and services to run and manage IVR systems, including: Avaya of Santa Clara, Calif. <http://www.avaya.com/usa/>, Cicso Systems of San Jose, Calif. <http://www.cisco.com/en/US/products/sw/custcosw/ps3651/>, Genesys Telecommunications Laboratories of Daly City, Calif. <http://www.genesyslab.com/>, Nuance Communications of Burlington, Mass. <http://www.nuance.com/index.htm>, Verint of Melville, N.Y. <http://www.verint.com/>, and Voxeo products <http://voxeo.com/> offered by Aspect Software Group of Chelmsford, Mass.

Unfortunately, complex IVR systems can often lead to time wasted by the user trying to navigate the tree to find the answer to a simple question. This often leads to frustration on the part of the user. Users may have inadvertently pressed the wrong key on the phone keypad, finding themselves at a destination they did not want or even recognize, with no option to go "back" in the tree to try again. Or, the IVR system may have misunderstand a voice response, due to a noisy phone connection, a user's unexpected accent or use of unusual phrasing (such as saying "Sure" or "OK" instead of "Yes") or simply poor voice recognition algorithms. In such a situation, the IVR system has again directed the user to a destination that is unknown or unwanted. The IVR system may also be giving instructions in a language that is not well understood by the caller—the caller may wish to contact a company or agency about a topic that they are able to competently discuss, but must listen to often long descriptions of topics they may not understood and therefore find additionally confusing.

Some IVR systems have grown more sophisticated, becoming more capable of recognizing the wide variation possible in user input. However, problems remain, deterring users who have had bad experiences with an organization's IVR system. Online directories, such as provided by Gethuman.com <http://gethuman.com/> or Whatis.com <http://whatis.techtarget.com/reference/Bypass-IVRS-Talk-to-a-real-person-cheatsheet> have appeared to help users bypass IVR systems altogether.

Although some companies may "hide" behind confusing IVR phone trees to avoid dealing with dissatisfied customers, many organizations deploying IVR systems, such as government agencies, legitimately want to provide service to as many callers as possible, but have budget limitations on the number of employees or call centers they can pay to answer phones. There is therefore a need for a system that can help guide users through the phone trees of an IVR system quickly and efficiently.

BRIEF SUMMARY OF THE INVENTION

The invention presented here is a system for use with telephones having a visual display, such as mobile smartphones. The system recognizes an input from the user (such as the input of the beginning of a phone number) that identifies the organization to be called, and accesses a stored representation of the phone tree for that organization. This representation of the phone tree may be stored locally, or remotely in an online server. The system then presents a graphical representation of all or part of the phone tree on the display of the telephone. The user can then respond to the graphical representation by providing selective input that triggers the system to synthesize all or part of the dialing sequence needed to navigate the phone tree to the desired destination. Once a dialing option has been completely synthesized to the user's satisfaction, the user may provide additional input that the system then interprets as an instruction to open a phone call and dial the synthesized number.

DETAILED DESCRIPTIONS OF EMBODIMENTS OF THE INVENTION

I. Introduction

What follow are detailed descriptions of embodiments of the invention, including the best mode contemplated by the inventors at this time. It will be recognized that these embodiments are generally implemented as software code written in languages such as C, Objective C, C++, Java or C# and executed on "smartphones" using operating systems such as iOS® and its variations for Apple products, various versions of the Android® operating system distributed by Google Inc., or Windows® Phone OS distributed by Microsoft Corp. Other smartphone operating systems, such as Symbian, Blackberry OS, QNX, Blackberry 10, etc. will be known to those skilled in the art.

II. Smartphone Structure

Figure 2:
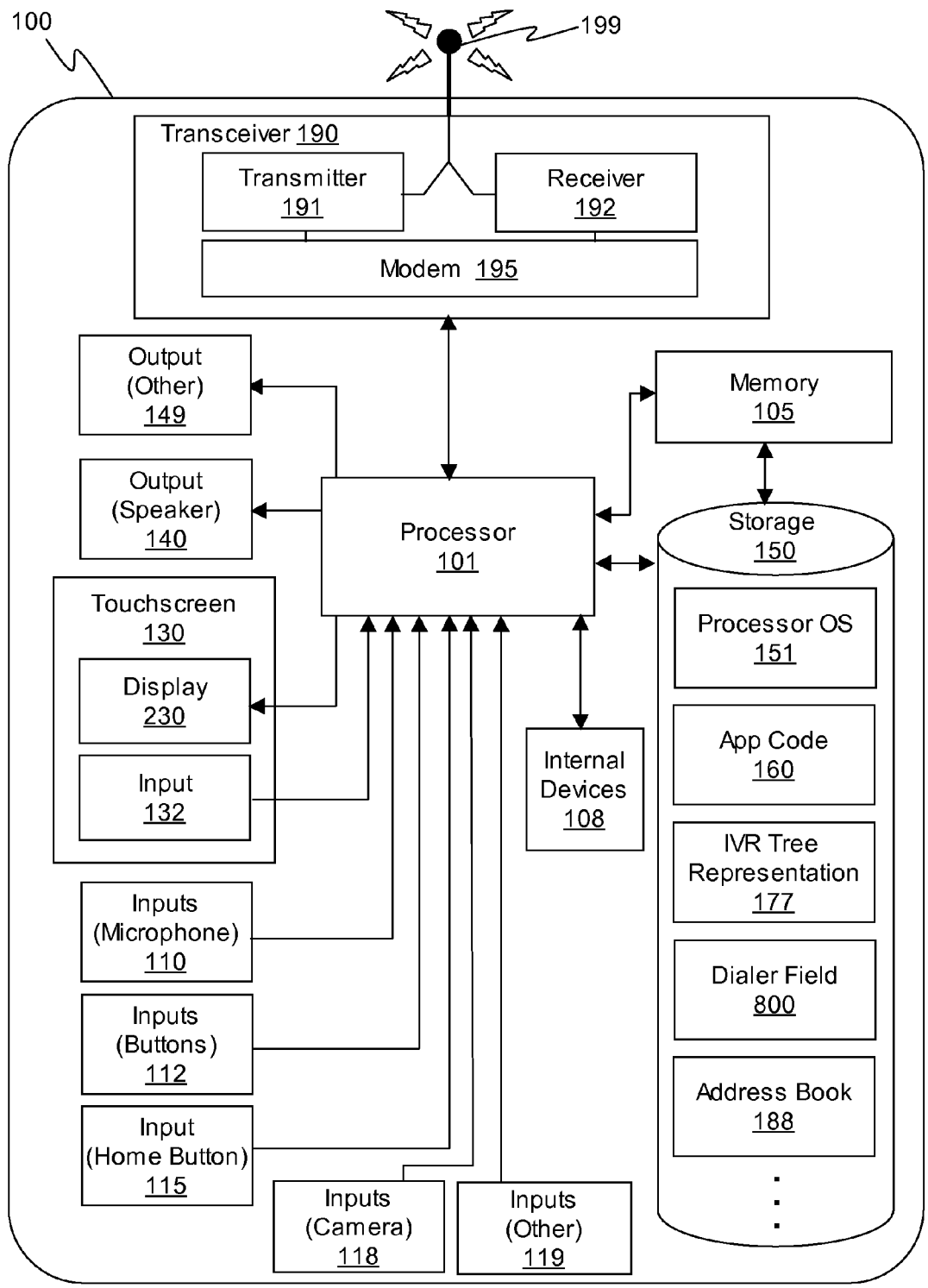
FIG. 2 presents a block diagram for a smartphone comprising software that executes the method of the invention.

Although embodiments of this invention may be implemented on any electronic data processing system with an interface to a telephone network, typical embodiments will be implemented on a "smartphone". A block diagram of the components of a typical smartphone 100 upon which the invention may be implemented is illustrated in FIG. 2. Such a smartphone 100 will typically include a processor 101 such as a microprocessor or other central processing unit (CPU), such as a system-on-chip (SoC) manufactured according to the ARM processor architecture designed by ARM Holdings plc of Cambridge, UK, or the Snapdragon S4 architecture from Qualcomm, Inc. of San Diego, Calif. The processor may be single core, or have multiple cores, and may be paired with additional graphics processing units (GPUs), such as a Mali GPU design from ARM Holdings plc, Adreno chips from Qualcomm, Inc. of San Diego, Calif., or Tegra chips provided by Nvidia Inc. of Santa Clara, Calif.

The processor 101 will coordinate electronic signals to and from a built-in transceiver 190, which transmits and receives radio frequency (RF) signals to and from remote transceivers via one or more antennas 199. The transceiver 190 will typically comprise both one or more RF transmitters 191 and one or more RF receivers 192 as well as a modulator/demodulator (or modem) 195 that converts analog RF signals into digital signals for use within the phone, as well as converting internal digital signals into RF broadcast signals. The RF signals transmitted between the smartphone 100 and a remote transceiver may also comprise both traffic and control signals (e.g., paging signals/messages for incoming calls), which are used to establish and maintain communication with another party or destination.

Within the smartphone 100, the processor 101 can coordinate electronic signals from a number of sources, which will typically include internal memory 105, often comprising transient random access memory (e.g. dynamic random access memory, or DRAM), and may also include various internal data storage devices 150, which are typically may be read/write media, or may be non-transient computer readable media, and which may comprise flash memory devices, removable subscriber identity module (SIM) cards, micro-SIM cards, nanoSIM cards and the like.

The storage devices 150 may include a general purpose storage that is used to store both program instructions for the processor 101, such as the smartphone operating system (OS) 151, as well as the program instructions for one or more program products, or applications ("apps") 160 that may be executed using the processor 101. Aside from these programs, data, such as audio data, video data, configuration data, and/or other data or databases that may be accessed and/or used by the apps 160 and processor 101 may be stored as well. The storage devices 150 may include a nonvolatile read/write memory, a read-only memory (ROM) and/or volatile read/write memory. Various application programming interfaces (APIs) may be used to specify how various software components should interact with each other and with the data stored in the storage devices 150.

Figure 1:
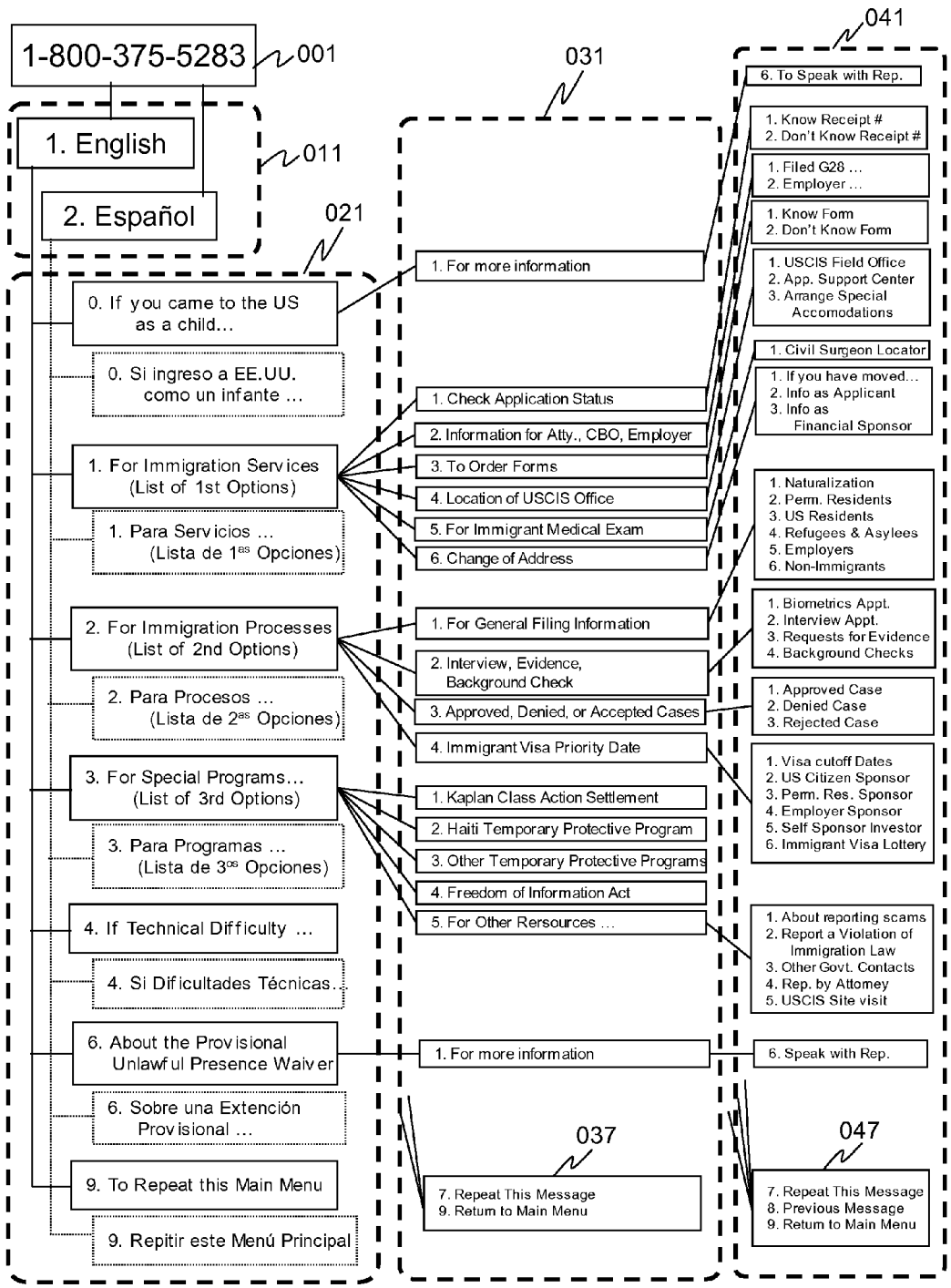
FIG. 1 illustrates the IVR phone tree for the US Citizenship and Immigration Service (USCIS).

In some embodiments of the invention, the storage devices 150 may have stored therein an electronic database representing various IVR phone trees 177, such as the phone tree illustrated in FIG. 1. In some embodiments of the invention, the storage devices 150 may have stored therein an electronic representation of a Dialer Field 800 that stores data related to a dialstring the user synthesizes for the purpose of making a phone call. In some embodiments of the invention, the storage devices 150 may have stored therein an electronic database representing an address book 188 with contact information defined by name and address, such as telephone numbers, email addresses and so on. The name used for items in the contact book need not be real names of persons, but may be any combination of identifying characters.

Furthermore, the storage devices 150 may include "temporary" data storage for a database of unsaved numbers. This "temporary" data storage may be used for storing call lists, such as telephone numbers of received or missed calls from remote parties. The storage devices 150 may be considered "temporary" in the sense that unsaved numbers are automatically deleted after a predetermined time period counted in days, weeks or months. Alternatively, the temporary data storage may hold only a limited number of positions, working on a first-in/first-out basis. In this case, the storage devices 150 is "temporary" in the sense that an unsaved number is pushed step-by-step through the list by subsequently received calls until it is pushed out of the list.

The processor 101 will also coordinate electronic signals from a number of input devices, such as: one or more microphones 110, various input buttons 112 (e.g. for controlling sound volume), a "home" button 115, one or more cameras 118, or other inputs 119 such as proximity sensors, ambient light sensors, and the like. The processor 101 may also coordinate electronic signals from built-in devices 108 such as an accelerometer, magnetometer, GPS sensor, or gyroscopic sensor and the like.

The processor 101 will also coordinate electronic signals to a number of output devices, such as: one or more speakers 140, or various other output devices 149. A variety of other input 119 and outputs 149 can be coordinated through a docking connector, audio jacks, or other output connections.

In a typical smartphone 100, the processor 101 will also coordinate electronic signals to and from a touchscreen 130. The touchscreen 130 is typically a flat device comprising both a display 230 having an array of either illuminated liquid crystal elements or light emitting diodes (LEDs) to display information, and an array of built-in touch sensors 135 that may sense electrical conductivity of a finger, or sense pressure on the device through changes in electrical capacitance. When the software operating on the smartphone 100 displays various images, fields, and graphics on different portion of the display 230, various corresponding inputs from the sensors 135 provided by the user can be generated by touching the corresponding portions of the display. The app and operating system software interpret the pressure and/or temperature and/or conductivity at different points of the screen differently, which allows, for example, the virtual "pressing of a button" when the user touches the image of a "button" on a screen, or the use of a pinching motion by two fingers to virtually "zoom-in" (or the opposite motion to "zoom-out") a displayed image.

Software code written for smartphones is often packaged as a dedicated application, or "app" 160. The smartphone operating system will allow the display of a graphical icon, stored typically as a 57×57 pixel PNG file, on the touchscreen display, and when the position on the screen where the icon is displayed is touched (or, depending on the smartphone and the operating system, pressed and held under pressure for a predetermined time), the signal generated is interpreted as an instruction to launch the software program associated with the icon. Various apps may additionally provide a virtual "button" on the display labeled "close" that the user can press and hold to stop the execution of the app and return to the smartphone's home screen.

The smartphone operating system generally provides the code for instructions that, among other things, interpret the signal strength and duration of a touch on the screen into instructions for executing various portions of stored code. The instruction code for apps must generally conform to the standards for the operating system under which they were written. One standard for the iPhone produced by Apple Inc. of Cupertino, Calif., is the "iOS App Programming Guide" (Apple Inc. Oct. 23, 2013) <https://developer.apple.com/library/ios/documentation/iPhone/Conceptual/iPhoneOSProgrammingGuide/iPhoneAppProgrammingGuide.pdf>. Others will be available for other smartphone operating systems, such as Android, Microsoft Windows OS, etc. and will be known to those skilled in the art.

Typical embodiments of the method disclosed with this Application can be implemented by means of software code designed to run on a smartphone 100. The smartphone may execute instructions encoded in the software that use the various built-in functions available to smartphones, such as dialing a phone number, or accessing data stored in the Internet through a Wi-Fi or some other data connection, such as those typically provided by the smartphone's data carrier. The software code comprising the instructions for executing the method of the invention may typically be stored on local non-transient memory storage 150 within the smartphone 100, such as a flash memory storage device. When descriptions of the method herein are provided, such as "the user presses a button", or "the user presses and holds the key", they are to be typically understood as the pressing of virtual "buttons" as displayed on the smartphone touchscreen, as managed through the non-transient stored code of the app and the operating system, and do not represent real physical "buttons".

Figure 3:
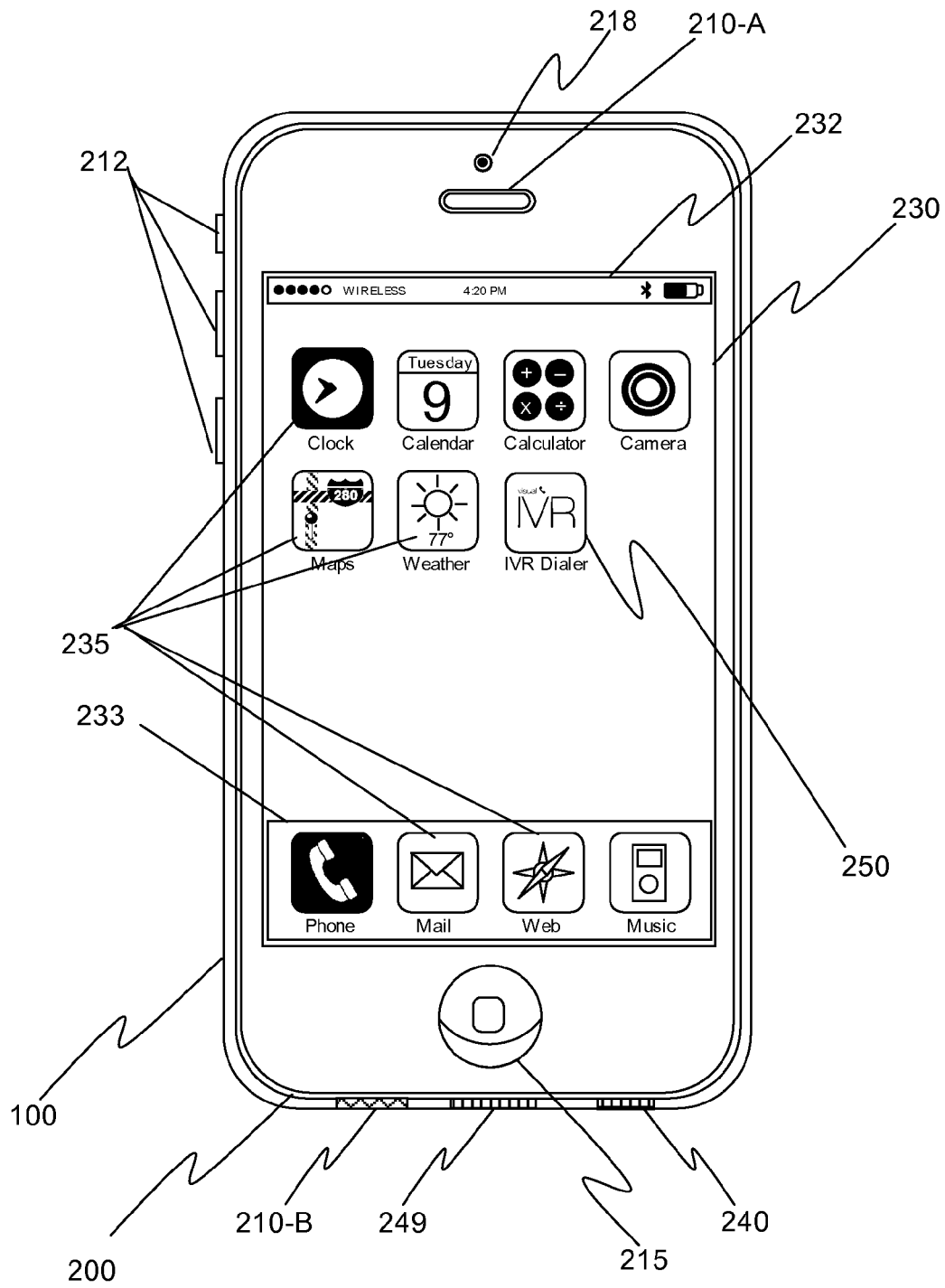
FIG. 3 illustrates a typical home screen display for a smartphone, illustrated including an example of an icon used to launch software that executes the method of the invention.

FIG. 3 illustrates an example of a typical smartphone 100 in which an embodiment of the invention has been implemented. In this example, the smartphone 100 is drawn to appear as a product similar to an iPhone manufactured by Apple Inc. Although this illustration drawn to reflect the appearance used in a particular smartphone, other configurations and operating systems for smartphones will be known to those skilled in the art, and these illustrations are not intended to limit the invention to a particular type or style of smartphone.

The smartphone 100 may comprise an outer casing 200, one or more cameras 218, one or more microphones 210-A and 210-B, a speaker 240, various physical buttons 212 for controls such as audio volume adjustment, a home button 215 for controlling the functions of the phone (turning the phone on or off, answering the phone, reverting to the home screen, etc.) one or more cameras 218, and a touchscreen display 230. A docking connection 249 may also be provided to allow external inputs 119 and outputs 144, as previously described, to be connected.

For most smartphone operating systems, there is typically a portion 232 of the touchscreen display 230 reserved for displaying items dictated by the phone operating system no matter which app is running, and this portion 232 is used to display items such as the time of day, phone signal strength, remaining battery life, etc. Other portions of the touchscreen display 230 can be designated to display various icons 235, each representing a stored software program which can be executed by the phone. The graphical file for the icon, typically a file in a portable network graphics format (also known as a .PNG file) will typically be governed by the smartphone operating system, and will be stored on the storage devices 150 such as flash memory built into the smartphone 100. Certain portions 233 of the display 230 may be designated to display specific, commonly used icons, while other portions may be more generally used.

In some embodiments of the invention, the software or "app" implementing the methods of the invention will also have an icon 250. The execution of this software code can be initiated by the user touching the smartphone touchscreen at the position the icon 250 is displayed, effectively pressing the "button" for the app to launch the program it represents.

For the methods of the invention, there are several embodiments that may be designed, depending on the structure and detail present in the phone tree. For a phone tree such as the USCIS phone tree of Table I and FIG. 1, the IVR options can be quite detailed and do not lend themselves to representation as simple single "buttons" on a phone display. Instead, an embodiment of the method illustrated in FIGS. 4 through 14 may be used to provide visual navigation through the phone tree.

III. A First Phone Tree Embodiment: Sequential Option Selection

A. The USCIS Phone Tree.

Table I (presented in 9 parts) presents an example for a phone tree for a government agency, in this case the United States Citizenship and Immigration Service (USCIS). This phone tree has several tiers of responses available to the user, in both English and Spanish. FIG. 1 presents these same tiers of options for the USCIS Phone tree of Table I in a graphical illustration.

In the Top Tier 001, the direct dial phone number is represented. This usually comprises a country code (in the case of the US, the single digit "1"), followed by a 3 digit Area Code (in this case, the toll free indicator "800"), a 3-digit prefix (in this case, "375") and a 4-digit number (in this case, "5283").

In the $1^{st}$ Tier 011, the first set of options presented to the caller is presented. In the case of the USCIS, The $1^{st}$ Tier choices for the user allow the selection of language with English or Spanish as options.

In the $2^{nd}$ Tier 021, the further options provided when one of the $1^{st}$ Tier options is selected are listed. In this case, seven options are provided: 0, 1, 2, 3, 4, 6, and 9. The same numerical options are provided for English and Spanish. This Tier is the one generally referred to in this phone tree as the "Main Menu".

In the $3^{rd}$ Tier 031, the further options provided when one of the $2^{nd}$ Tier options is selected are listed. The number of choices varies, depending on the $2^{nd}$ Tier selection made. If "0" is selected as the $2^{nd}$ Tier option, the only $3^{rd}$ Tier options are 1 and 9. If "1" is selected as the $2^{nd}$ Tier option, the 3rd Tier options are 1, 2, 3, 4, 5, 6, 7 and 9. Note that a subset 037 of the $3^{rd}$ Tier options will be uniform options no matter what $2^{nd}$ Tier option has been selected: "7" will cause the immediate $3^{rd}$ Tier message to be repeated, and "9" returns to the Main Menu (in this case, to the $2^{nd}$ Tier 021).

In the $4^{th}$ Tier 041, the further options provided when one of the $3^{rd}$ Tier options is selected are listed. The number of choices varies, depending on the $3^{rd}$ Tier selection made. If "5" is selected as the $3^{rd}$ Tier option after selecting "1" as the $2^{nd}$ Tier option, the only $4^{th}$ Tier options are 1, 7, 8 and 9. If "2" is selected as the $3^{rd}$ Tier option after selecting "2" as the 2nd Tier option, the $4^{th}$ Tier options are 1, 2, 3, 4, 5, 6, 7, 8 and 9.

TABLE I

USCIS Top Tier: 1-800-375-5283

| $1^{st}$ Tier | $2^{nd}$ Tier | $3^{rd}$ Tier | $4^{th}$ Tier |
| --- | --- | --- | --- |
| USCIS Phone Tree (Part 1) | | | |
| 1. To continue in English | | | |
| | 0. If you came to U.S. as a child and you're seeking information regarding the new process for deferred action . . . | | |
| | | Individuals may be considered for deferred action as a childhood arrival if they: were under the age of 31 as of Jun. 15, 2012; came to the U.S. before reaching his or her 16th birthday; have continuously resided in the U.S. since Jun. 15, 2007 up to the present time; were present in the U.S. on Jun. 15, 2012 and at the time of making his or her request for consideration of deferred action with USCIS; entered without inspection before Jun. 15, 2012, or his or her lawful immigration status expired as of Jun. 15, 2012; | |

TABLE I-continued

USCIS Top Tier: 1-800-375-5283

| 1st Tier | 2nd Tier | 3rd Tier | 4th Tier |
|---|---|---|---| are currently in school;
      have graduated or obtained a certificate for completion from high school;
      has obtained a general education development certificate;
      or is an honorably discharged veteran of the coast guard or armed forces
      of the U.S.;
      have not been convicted of a felony, significant misdemeanor, 3 or more
      other misdemeanors, and does not otherwise pose a threat to national
      security or public safety.
      Individuals may begin to request consideration of deferred action for
      childhood arrivals on Aug. 15, 2012. Please do not file before Aug. 15.
      If you file early, your request will be rejected.
      For further information, please visit our website at
      uscis.gov/childhoodarrivals.
      1. For more information . . .
          6. To speak with a representative about this topic.
          7. To repeat this message.
          8. To hear the previous message.
          9. To return to the Main Menu.
      7. To repeat this message.
      9. To return to the Main Menu.
  6. For information about the new process to apply for a provisional unlawful presence waiver
      USCIS is implementing a process change that will allow certain immediate
      relatives of US citizens who are physically present in the U.S. and are seeking
      permanent residence to apply for and receive provisional unlawful presence
      waivers.
      USCIS will begin accepting applications for provisional unlawful presence
      waivers beginning Mar. 4, 2013.
      To apply, you must submit form I-601A, the application for a provisional
      unlawful presence waiver. This form will be available on our website at
      uscis.gov once this process change is in effect.
      USCIS will not accept applications for provisional unlawful presence waivers
      until the effective date of Mar. 4, 2013. Any applications received before that
      date will be rejected, and the application will be returned to the sender.
      1. For more information . . .
          For comprehensive information about the eligibility
          requirements and the application process for the
          provisional unlawful presence waiver program,
          please visit our website at uscis.gov.
          6. To speak with a representative about this topic . . .
          7. To repeat this message.
          8. To hear the previous message.
          9. To return to the Main Menu.
      7. To repeat this message.
      9. To return to the Main Menu.
         USCIS Phone Tree (Part 2)

1. To continue in English (cont.)
  Please listen carefully. The options on our Main Menu have changed.
  Customer service representatives are available on this line from 8 AM to 6 PM
  Monday through Friday.
  1. For immigration services, such as case status, forms, locating a USCIS office, civil
  surgeons, change of address,
  or if you're an attorney, community based organization, or employer . . .
      1. To check the status of an application that you have submitted,
      or to report a problem with your application . . .
          1. If you know your receipt number . . .
          2. If you do not know what a receipt number is, if
          you do not know where to find it, or if you have
          lost your receipt number . . .
          7. To repeat this message.
          8. To hear the previous message.
          9. To return to the Main Menu.
      2. For services and information for attorneys, CBOs, and employers.
          1. If you are an attorney, a credited representative,
          or community based organization who has filed a
          G28 for a client . . .
          2. If you are an employer enquiring about the
          status of a petition you have filed on behalf of
          your employee . . .
          If you are an employer calling for general
          information, please call the toll free number for
          employers at 1-800-375-2099.
          7. To repeat this message.
          8. To hear the previous message.
          9. To return to the Main Menu.

TABLE I-continued

USCIS Top Tier: 1-800-375-5283

| $1^{st}$ Tier | $2^{nd}$ Tier | $3^{rd}$ Tier | $4^{th}$ Tier |
|---|---|---|---|

3. To order forms from USCIS.
            1. If you know the name or the number of the Form that you want to order . . .
            2. If you are not sure which form you need, or if you have questions about filing a form . . .
            To see a complete list of USCIS forms and to see which forms you can file electronically, please visit our website at uscis.gov.
            If you need to order 50 or more copies of a form, please contact the Government Printing Office to inquire about which forms are available in large quantities. The phone number is 202-512-1800.
            7. To repeat this message.
            8. To hear the previous message.
            9. To return to the Main Menu.
        4. For the location of the USCIS field office or the Application Support Center that serves your area . . .
            1. For information about the USCIS Field Office that serves your area . . .
            2. For information about the Application Support Center that serves your area . . .
            3. To arrange for a special accommodation during a visit to a USCIS facility . . .
            7. To repeat this message.
            8. To hear the previous message.
            9. To return to the Main Menu.
            USCIS Phone Tree (Part 3)

1. To continue in English (cont.)
    1. For immigration services (cont.)
        5. To find a civil surgeon in your area who can perform an immigration medical examination . . .
            Welcome to our Civil Surgeon Locator.
            To find a physician who can perform a immigration medical examination, we will ask you to enter a zip code for either: your home, place of work, or destination where you will be traveling.
            Any authorized civil surgeon may perform this examination.
            When you contact the doctor's office, please inform them you need an USCIS immigration medical examination.
            1. To proceed to our Civil Surgeon Locator.
            7. To repeat this message.
            9. To return to the Main Menu.
        6. To change your address . . .
            1. If you have already moved and you need to change your address.
            2. For general information about changing your address as an Applicant, petitioner, or beneficiary.
            3. For general information about changing your address as the financial sponsor for an immigrant foreign national.
            7. To repeat this message.
            8. To hear the previous message.
            9. To return to the Main Menu.
        7. To repeat this message.
        9. To return to the Main Menu.
    2. For information about immigration benefits and processes, such as interviews, biometrics, requests for evidence, background checks, or processing times . . .
        1. For general filing information . . .
            1. For filing information about naturalization.
            2. For Permanent Residents.
            3. For US Citizens.
            4. For Refugees and Asylees.
            5. For Employers and Investors.
            6. For Non-Immigrants.
            7. To repeat this message.
            8. To hear the previous message.
            9. To return to the Main Menu.
        2. If you currently have a pending case, and want general information about interview or biometric appointments, requests for evidence, background checks, or case processing times . . .
            1. If you want information about biometrics appointments at your local Application Support TABLE I-continued USCIS Top Tier: 1-800-375-5283

| 1st Tier | 2nd Tier | 3rd Tier | 4th Tier |
|---|---|---|---|
| | | | Center . . . |
| | | | 2. If you want information about interview appointments . . . |
| | | | 3. If you want information about requests for evidence . . . |
| | | | 4. If you want information about background checks . . . |
| | | | If you want information about case processing times, please visit our website at www.uscis.gov |

USCIS Phone Tree (Part 4)

1. To continue in English (cont.)
    2. For information about immigration benefits and processes (cont.)
        2. If you currently have a pending case (cont.)
            7. To repeat this message.
            8. To hear the previous message.
            9. To return to the Main Menu.
        3. For information about approved, denied, or rejected cases.
            1. If you are calling about an approved case.
            2. If you are calling about a denied case.
            3. If you are calling about a rejected case.
            7. To repeat this message.
            8. To hear the previous message.
            9. To return to the Main Menu.
        4. To hear current priority dates for immigrant visas and the availability of diversity lottery numbers . . .
            1. For information about Visa cutoff dates.
            2. If you are a US Citizen who is Sponsoring a family member.
            3. If you are a Permanent Resident who is Sponsoring a family member.
            4. If you are an Employer who is Sponsoring an employee.
            5. If you are a Self Sponsoring Investor.
            6. For the Immigrant Visa Lottery . . .
            7. To repeat this message.
            8. To hear the previous message.
            9. To return to the Main Menu.
        7. To repeat this message.
        9. To return to the Main Menu.
    3. For Information about special programs and other resources, such as the Kaplan class action lawsuit, temporary protected status, the Freedom of Information Act, Privacy Act, or to report an immigration scam . . .
        1. For information about the settlement in the Kaplan Class Action Suit.
        2. For information about temporary protected status program for Haiti.
        3. For information about temporary protected status program for all other countries.
        4. For information about the Freedom of Information Act.
        5. For other resources . . .
            1. To hear how to report an immigration scam to federal or state law enforcement authorities . . .
            2. To report a violation of Immigration Law.
            3. To hear contact information for other Government Agencies . . .
            4. To hear about representation by an attorney or other party in a matter before USCIS or the Board of Immigration Appeal . . .
            5. For information about the USCIS administrative site visit and verification program . . .
            7. To repeat this message.
            8. To hear the previous message.
            9. To return to the Main Menu.
        7. To repeat this message.
        9. To return to the Main Menu.
    4. If you are experiencing technical difficulty with the electronic immigration system . . .
    9. To repeat this Main Menu, or to return to it at any time during your call.
    To end your call, hang up.

USCIS Phone Tree (Part 5)

2. Para continuar en Español
    0. Si usted ingreso a los Estados Unidos como un infante y esta buscando información sobre el nuevo proceso de acción diferida . . .
        Individuos pueden ser considerados para acción diferida si ellos:
        fueron menores de 31 años de edad a partir del 15 de Junio del 2012;
        ingresaron a los Estados Unidos antes de los 16 años de edad;
        han residido continuamente en los Estados Unidos por un período mínimo de TABLE I-continued USCIS Top Tier: 1-800-375-5283

| 1ˢᵗ Tier | 2ⁿᵈ Tier | 3ʳᵈ Tier | 4ᵗʰ Tier |
| --- | --- | --- | --- |

5 años antes del 15 de Junio del 2012, y han residido continuamente en los
                Estados Unidos desde el 15 de Junio del 2012;
                estuvieron presentes en los Estados Unidos el 15 de Junio del 2012 y esta
                presente en los Estados Unidos en el momento en que somete su solicitud de
                acción diferida a USCIS;
                ingresaron sin inspección antes del 15 de Junio del 2012, o su estatus legal
                de inmigración expiró el 15 de Junio del 2012;
                actualmente asisten a la escuela;
                haberse graduado o obtenido un certificado de finalización de la escuela
                superior o ceder un certificado de educación general GED en Inglés;
                haber servido en la guardia costera o las fuerzas armadas de los EE.UU.;
                no han sido encontrados culpable de un delito grave, delito menos grave de
                carácter significativo, multiples delitos menos graves, o representar una
                amenaza a la seguridad nacional o la seguridad pública.
                Individuos pueden solicitar consideración para la acción diferida a partir del
                15 de Agosto del 2012. Por favor no solicite antes del 15 de Agosto. Todas
                las solicitudes recibidas antes del 15 de Agosto de 2012 serán rechazadas.
                Para más información, por favor visite nuestro sitio web en
                uscis.gov/childhoodarrivals.
                1. Para obtener más información . . .
                        6. Para hablar con un representante sobre este tema
                        7. Para repetir este mensaje.
                        8. Para escuchar el mensaje anterior.
                        9. Para volver al menú principal.
                7. Para repetir este mensaje.
                9. Para volver al menú principal.
        6. Para obtener información sobre el nuevo proceso para solicitar una extensión provisional
        por presencia illegal.
                USCIS esta implementando un cambio de processo que permitirá a ciertos
                familiares inmediatos de cuidadanos estadounidenses que estan fisicamente
                presentes en los Estados Unidos y buscan la residencia permanente, solicitar
                y recibir una extensión provisional por presencia ilegal.
                USCIS comienza a aceptar solicitudes para una extensión provisional por
                presencia ilegal a partir del 4 de Marzo del 2013.
                Para solicitud, debe de presentar el formulario I-601A, solicitud de extensión
                por precencia ilegal. Este formulario estará disponible en nuestro sitio web
                uscis.gov una vez que el cambio de proceso este en efecto.
                USCIS no acepta solicitudes de extensión provisional de presencia ilegal
                hasta la fecha de efectividad del 4 de Marzo del 2013. Todas las solicitudes
                recibidas antes de esa fecha serán rechazadas y la solicitud será de vuelta al
                remitente . . .
                1. Para obtener más información . . .
                        Para información completa sobre los requisitos de
                        elegibilidad y el proceso de solicitud para el
                        programa extensión provisional por presencia ilegal
                        por favor visite nuestro sitio web en uscis.gov.
                        6. Para hablar con un representante sobre este tema
                        7. Para repetir este mensaje.
                        8. Para escuchar el mensaje anterior.
                        9. Para volver al menú principal.
                7. Para repetir este mensaje.
                9. Para volver al menú principal.
                      USCIS Phone Tree (Part 6)

2. Para continuar en Español (cont.)
    Escuche cuidadosamente, las opciones del menú principal han cambiado.
    Los representantes del servicio al cliente están disponibles en esta línea desde las 8 am hasta
    las 6 pm de Lunes a Viernes.
    1. Para servicios de inmigración como estatus de caso, formularios, ubicar oficinas de USCIS,
    cirujanos civiles, cambiar de dirección,
    o si usted es un abogado, una organización de la comunidad, o empleador . . .
        1. Para verificar el estatus de una solicitud que ha enviado,
        o para reportar un problema con su solicitud . . .
            1. Si usted sabe su número de recibo . . .
            2. Si usted no sabe cual es el número de recibo, si
            no sabe donde encontrarlo, o si lo ha perdido . . .
            7. Para repetir este mensaje.
            8. Para escuchar el mensaje anterior.
            9. Para volver al menú principal.
        2. Para servicios e información para abogados, organizaciones comunitarias,
        y empleadores . . .
            1. Si usted es un abogado, representante acreditado,
            o organización comunitaria que ha presentado un
            formulario G28 para un cliente . . .
            2. Si usted es un empleador que solicita información
            sobre el estatus de una solicitud que ha TABLE I-continued USCIS Top Tier: 1-800-375-5283

| 1st Tier | 2nd Tier | 3rd Tier | 4th Tier |
|---|---|---|---| presentado en nombre de su empleado . . .
                      Si usted es un empleador que llama para obtener
                      información general comuniquese con el numero
                      gratuito para empleadores al 1-800-357-2099.
                      7. Para repetir este mensaje.
                      8. Para escuchar el mensaje anterior.
                      9. Para volver al menú principal.
              3. Para solicitar formularios del USCIS.
                      1. Si sabe el nombre o el número de formulario que
                      desea solicitar . . .
                      2. Si no esta seguro sobre cual formulario necesita,
                      o si tiene preguntas acerca de la presentación de
                      un formulario . . .
                      Para ver una lista completa de los formularios de
                      USCIS, como los formularios que puede presentar
                      electrónicamente, visite nuestro sitio web en
                      uscis.gov.
                      Si necesita pedir 50 o más copias de un formulario,
                      comuniquese con la oficina de imprenta
                      gubernamental (Government Printing Office) para
                      preguntar acerca de cual formularios están
                      disponibles en grandes cantidades. El número es
                      202-512-1800.
                      7. Para repetir este mensaje.
                      8. Para escuchar el mensaje anterior.
                      9. Para volver al menú principal.
              4. Para obtener la ubicación de la oficina de campo, o el centro de apoyo de
            solicitudes del USCIS que presta servicio en su área . . .
                      1. Para información sobre la oficina local de USCIS
                      que atiende a su area . . .
                      2. Para información acerca del centro de apoyo de
                      solicitudes que atiende a su área . . .
                      3. Para concertar un arreglo especial durante una
                      visita a un centro de USCIS . . .
                      7. Para repetir este mensaje.
                      8. Para escuchar el mensaje anterior.
                      9. Para volver al menú principal.
                    USCIS Phone Tree (Part 7)

2. Para continuar en Español (cont.)
    1. Para servicios de inmigración (cont.)
        5. Para encontrar un cirujano civil en su area quien puede realizar un
        examen médico de inmigración . . .
                Bienvenido al localizador de cirujanos civiles.
                Para asistir en localizar un cirujano civil que puede
                hacer un examen médico de inmigración, tendrá que
                marcar el código postal de su hogar, de su trabajo, o
                del lugar al cual esta viajando.
                Cualquier cirujano civil que esta autorizado puede
                hacer el examen.
                Cuando llame a la oficina del doctor, favor de
                informarles que desea un examen médico de
                inmigración del USCIS.
                1. Para proceder al localizador de cirujanos civiles.
                7. Para repetir este mensaje.
                9. Para volver al menú principal.
        6. Para cambiar su dirección . . .
                1. Si ya se ha mudado y desea cambiar su dirección.
                2. Para obtener información general sobre el cambio
                de su dirección, como solicitante, peticionario, o
                beneficiario.
                3. Para obtener información general acerca de como
                cambiar su dirección, como patrocinador financiero
                de un inmigrante extranjero.
                7. Para repetir este mensaje.
                8. Para escuchar el mensaje anterior.
                9. Para volver al menú principal.
        7. Para repetir este mensaje.
        9. Para volver al menú principal.
    2. Para obtener información sobre los beneficios y procesos de inmigración como entrevistas,
biométricos, solicitud de evidencia, verificación de antecedentes, o tiempos de procesamiento
            1. Para obtener información general sobre la presentación . . .
                1. Para obtener información de presentación para la
                naturalización.
                2. Para residentes permanents.
                3. Para ciudadanos Estadounidenses.

TABLE I-continued

| USCIS Top Tier: 1-800-375-5283 | | | |
|---|---|---|---|
| 1st Tier | 2nd Tier | 3rd Tier | 4th Tier |

4. Para refugiados y asilados.
        5. Para empleadores e inversionistas.
        6. Para no-inmigrantes.
        7. Para repetir este mensaje.
        8. Para escuchar el mensaje anterior.
        9. Para volver al menú principal.
      2. Si actualmente tiene un caso pendiente y desea obtener información general sobre la entrevistas o las citas biométricas, solicitudes de evidencias, verificaciones de antecedentes o los plazos de procedimiento del caso . . .
        1. Si desea información sobre las citas biométricas en el centro de soporte de solicitudes de su localidad . . .
        2. Si desea información sobre las citas para entrevistas . . .
        3. Si desea información sobre las solicitudes de evidencia . . .
        4. Si desea información sobre las verificaciones de antecedents . . .
        Si desea información sobre los plazos para el procedimiento de los casos, visite nuestro sitio web www.uscis.gov USCIS Phone Tree (Part 8)

2. Para continuar en Español (cont.)
  2. Para obtener información sobre los beneficios y procesos de inmigración (cont.)
    2. Si actualmente tiene un caso pendiente (cont.)
      7. Para repetir este mensaje.
      8. Para escuchar el mensaje anterior.
      9. Para volver al menú principal.
    3. Para obtener información sobre los casos aprovados, rechasados, o negados.
      1. Si esta llamando para averiguar sobre un caso aprobado.
      2. Si esta llamando para averiguar sobre un caso negado.
      3. Si esta llamando para averiguar sobre un caso rechazado.
      7. Para repetir este mensaje.
      8. Para escuchar el mensaje anterior.
      9. Para volver al menú principal.
    4. Para escuchar las fechas actuales de prioridad para las visas de inmigrantes y la disponibilidad de los números de la lotería de diversidad . . .
      1. Para obtener información sobre las fechas límite de las visas.
      2. Si es ciudadano de los Estados Unidos y patrocinador de un miembro familiar.
      3. Si es residente permanente y patrocinador de un miembro familiar.
      4. Si es un empleador y patrocinador de un empleado.
      5. Si es inversionista auto patrocinado.
      6. Para la lotería de visas de inmigrante.
      7. Para repetir este mensaje.
      8. Para escuchar el mensaje anterior.
      9. Para volver al menú principal.
    7. Para repetir este mensaje.
    9. Para volver al menú principal.
  3. Para información sobre programas especiales y otros recursos como el caso de la corte de las clases de Kaplan, servicios de protección temporal, acto de libertad de información, acto de privacidad, o para denunciar un fraude de inmigración . . .
    1. Para obtener información sobre la conciliación en la demanda de acción de clase de Kaplan.
    2. Para obtener información sobre el programa del estatus de protección temporal para Haiti.
    3. Para obtener información sobre el programa del estatus de protección temporal para todos los demas paises.
    4. Para obtener información sobre la ley de libertad de información.

USCIS Phone Tree (Part 9)

2. Para continuar en Español (cont.)
  3. Para información sobre programas especiales y otros recursos (cont.) . . .
    5. Para otros recursos . . .
      1. Para escuchar como denunciar a un fraude de inmigración a las autoridades de contenimiento de la ley federales o estadales . . .

TABLE I-continued

USCIS Top Tier: 1-800-375-5283

| 1st Tier | 2nd Tier | 3rd Tier | 4th Tier |
|---|---|---|---|
| | | | 2. Para reportar una violación de la ley de inmigración. |
| | | | 3. Para escuchar la información de contacto de otras agencias del govierno . . . |
| | | | 4. Para conocer acerca de la representación por un abogado u otra parte en un caso presentado ante el USCIS, o la junta de apelaciones de inmigración . . . |
| | | | 5. Para obtener información acerca del programa administrativo de visitas de verificación de USCIS . . . |
| | | | 7. Para repetir este mensaje. |
| | | | 8. Para escuchar el mensaje anterior. |
| | | | 9. Para volver al menú principal. |
| | | 7. Para repetir este mensaje. | |
| | | 9. Para volver al menú principal. | |
| | 4. Si esta experimentando dificultades técnicas con el sistema electrónico de inmigración . . . | | |
| | 9. Para repetir este menú principal o regresar en cualquier momento durante su llamada. | | |
| | Para finalizar su llamada, cuelgue. | | |

Note that a subset 047 of the 4th Tier options will be uniform options no matter what 3rd Tier option has been selected: "7" will cause the immediate 4th Tier message to be repeated, "8" returns to the previous tier (in this case 3rd Tier 031), and "9" returns to the Main Menu (2nd Tier 021).

For a phone tree with additional tiers of information, the subsequent selections would proceed in the same way, with additional selections possible for each entry at the previous tier. For the USCIS phone tree, there are no additional options for 4th Tier 041 selections—every choice at 4th Tier 041 either plays a pre-recorded information message to address a given question, or makes a connection with a live person in the identified department.

III. A First Phone Tree Embodiment: Sequential Option Selection

B. Description of the Embodiment.

FIGS. 4-7 represent the steps executed by one embodiment of the method of the invention on a smartphone having a touchscreen after initiation by the user. The embodiment of the invention described herein is for use with a detailed phone tree. In this example, the detailed USCIS phone tree of Table I and FIG. 1 is used.

As the initial step of the method of the invention, typically triggered by the "pressing" of the smartphone icon 250 for the app, the software begins execution, noted as the "Start" step 300. This typically involves loading the program steps into active memory 105, and their execution by the processor 101 built into the smartphone 100.

The next step 310 will typically be a display on the touchscreen 230 of a confirmation to the user that indicates that the app has launched (often simply the display of a logo, or a larger version of the icon). This step may optionally provide a "button" for selecting an option that invokes a list of previously dialed or constructed calls, as well as an option to proceed with the keypad for the IVR dialer.

Figure 8:
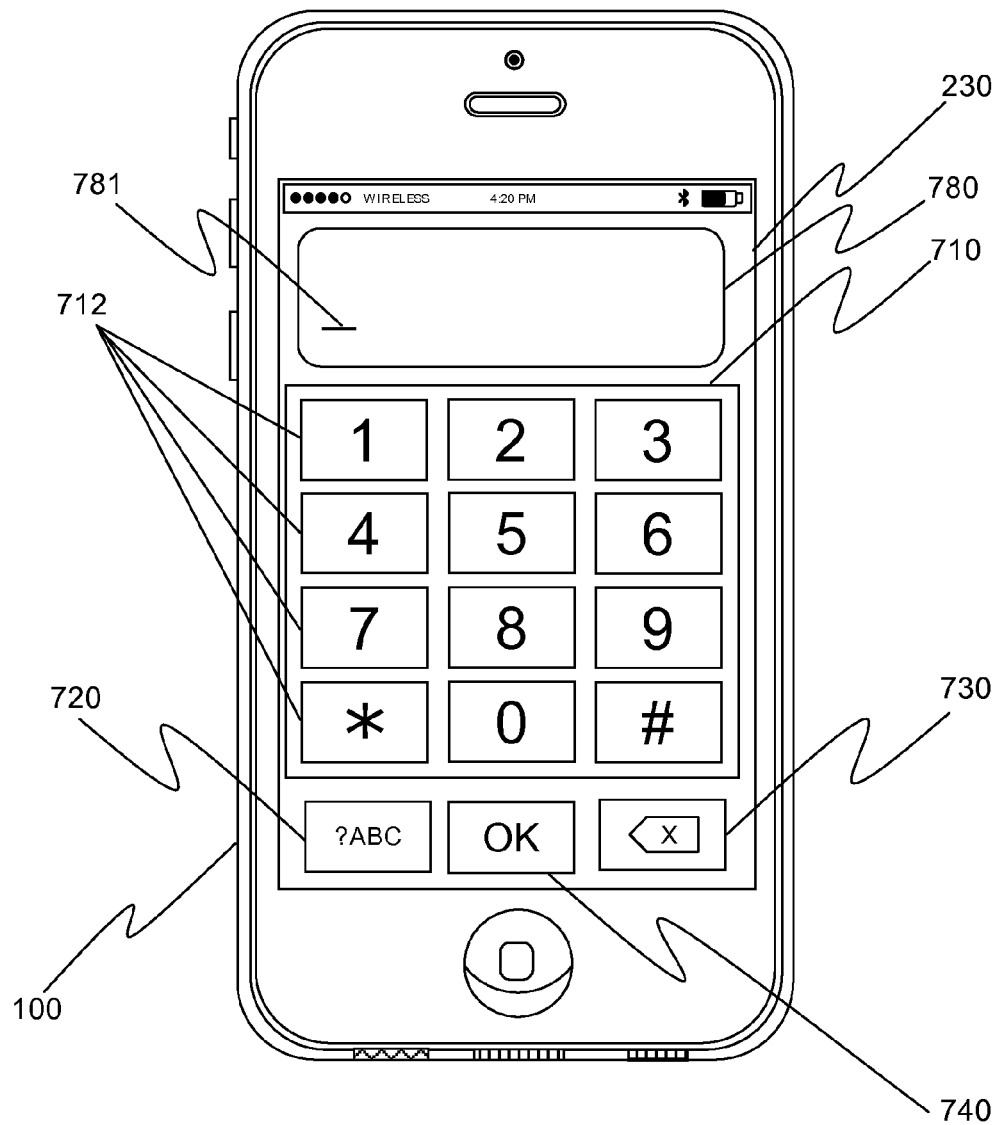
FIG. 8 illustrates the appearance of a smartphone executing the initial steps of an embodiment of the method of the invention.

If the user elects to proceed to the dialer, in the next step 320, an active input screen is displayed with a keypad and a display field for the user to begin making entries. An example of such a display screen is illustrated in FIG. 8. In this illustration, a portion of the touchscreen display 230 represents a keypad 710 consisting of twelve "buttons" 712, which correspond to a typical touchtone phone entry device, comprising the digits 0 through 9 and the "Star"* and "Pound" # keys. The upper part of the touchscreen display 230 comprises a portion of the display 780 designated to display the input from the user, and may additionally comprise a cursor 781 that may turn off and on, or "blink", as a prompt to indicate readiness for input.

Below the keypad 710, the touchscreen display 230 may additionally comprise an alphanumeric "button" 720 to switch to optional alphanumeric input mode (which would in turn typically have a corresponding numeric indicator "button" to switch back to numeric input), a "Back" button 730 to undo the user's immediate input, and an "OK" button 740 that may load the input into the Dialer Field once the user is done.

Figure 9:
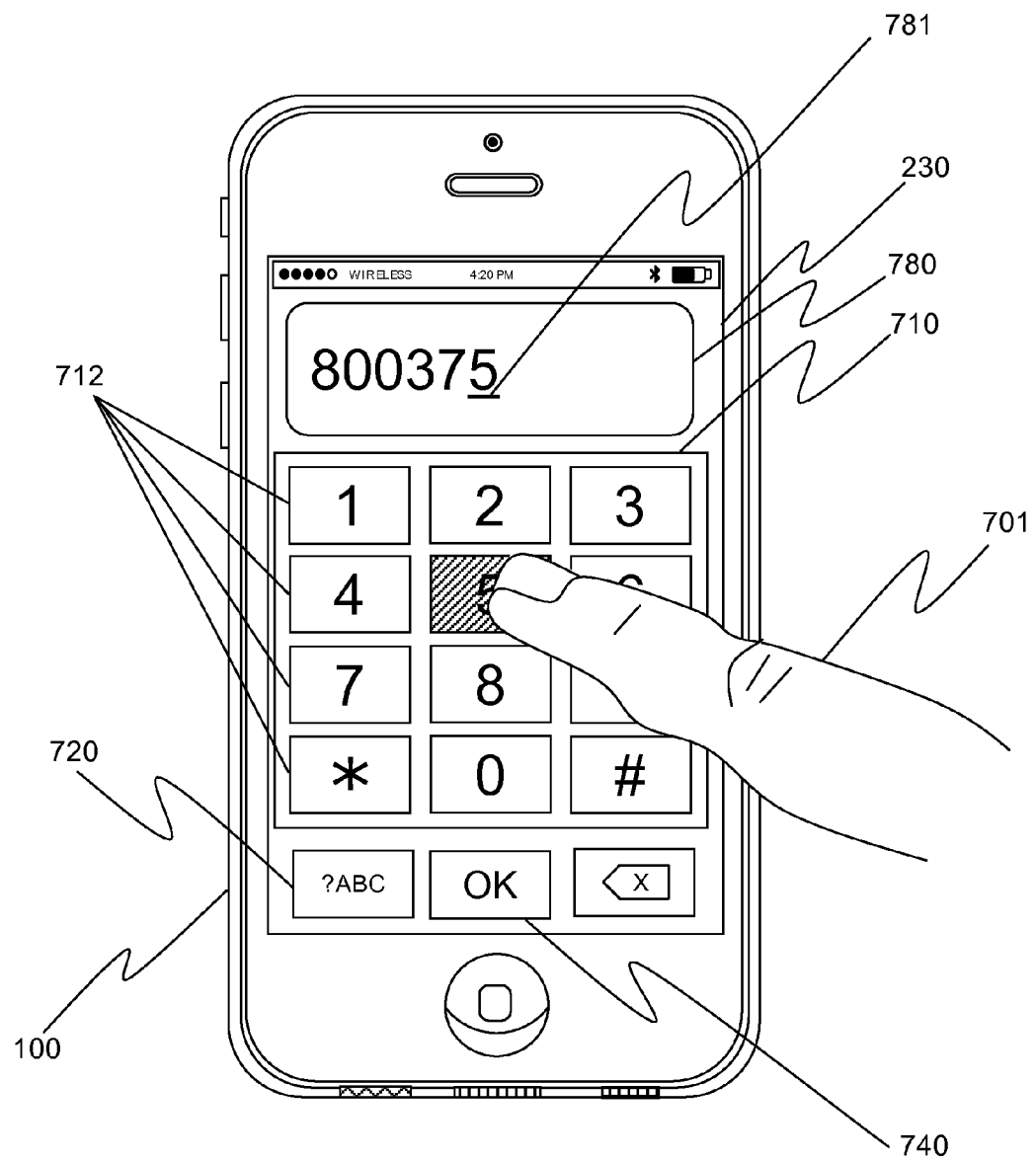
FIG. 9 illustrates a user generating input using a smartphone during the initial steps of an embodiment of the method of the invention.

Returning to FIG. 4, the next step 330 comprises accepting data input 331 from the user. The screen displayed in this mode is illustrated in FIG. 9. The input will typically be the entry of digits, such as 8 . . . 0 . . . 0 . . . 3 . . . 7 . . . 5 . . . selected by pressing some of the "buttons" 712 with a finger 701. The input portion 780 of the touchscreen display 230 may show the data previously entered, with the cursor 781 underscoring the character being currently entered. Alternatively, if the Text Entry "button" 720 has been pressed, the entry characters may be a text entry, such as "USCIS", which may be entered using a virtual keyboard or other text entry method that are often built into the operating system of the smartphone 100, and may be well known to those skilled in the art.

Returning to FIG. 4, the next step 340 compares the user input to the phone tree data stored in the IVR database 777 available to the app. This IVR database 777 will typically comprise a number of phone tree data entries, such as the tree illustrated in FIG. 1 and Table I, as well as metadata about the tree, such as the name of the agency or company whose tree is being represented. The IVR database may be written with any prior art database storage techniques, such as SQLite, SQL CE, HanDBase, Filemaker Go, Filemaker Bento, DriodDB, Java DB, eSQL etc. and can be accessed using standard database query languages such as SQL.

The comparison step 340 may execute automatically, with comparisons being made any time data is entered by the user. Alternatively, the software may be designed to make a comparison only once the "OK" "button" 740 has been pressed, or some other user indication of readiness to query the phone tree is entered. The comparison step 340 may make a comparison of entered numeric digits to the digits of the phone tree (for example, recognizing an entry of 8 0 0 3 7 5 . . . as possibly corresponding to the USCIS phone number 1-800-375-5283, or may recognize a keypad entry of U S C I . . . as corresponding to the USCIS phone number 1-800-375-5283.

If the comparison step 340 does not find a match with an element in the IVR database 777 during a predetermined time period, several options are possible. In some embodiments, if the input is not matched, the software can simply wait until further input is provided until a match is found. However, in other embodiments, the system may employ a time evaluation step 344 set for a predetermined time (for example, for 5 seconds) after which, if there is no match found by the comparison step 340, the next step 346 may be a display of a "No Match" message (optionally implemented as a temporary pop-up screen), and a return to a blank keypad entry screen as in step 320 (and as was illustrated in FIG. 8). If, on the other hand, the time evaluation step 344 detects additional user input 331 in the predetermined time, the system returns to the input step 330 to accept the input, and again makes a comparison 340 with the IVR database 777, either automatically or as triggered by the user.

In this embodiment, if the comparison step 340 identifies at least one match for the input data 331 with one or more entries in the IVR database 777, the next step 350 is a display of the matching options to the user. It should be noted that for a given entry, for example, 8 . . . 0 . . . 0, many phone trees may be available and displayed, and only further entry of the next digits 3 7 5 . . . will further narrow the options displayed from the IVR database 777. In some embodiments, the user may designate a setting within the software so that identified matching entries are only displayed after a certain number of digits (for example, 6 or 7 digits) have been entered.

Figure 10:
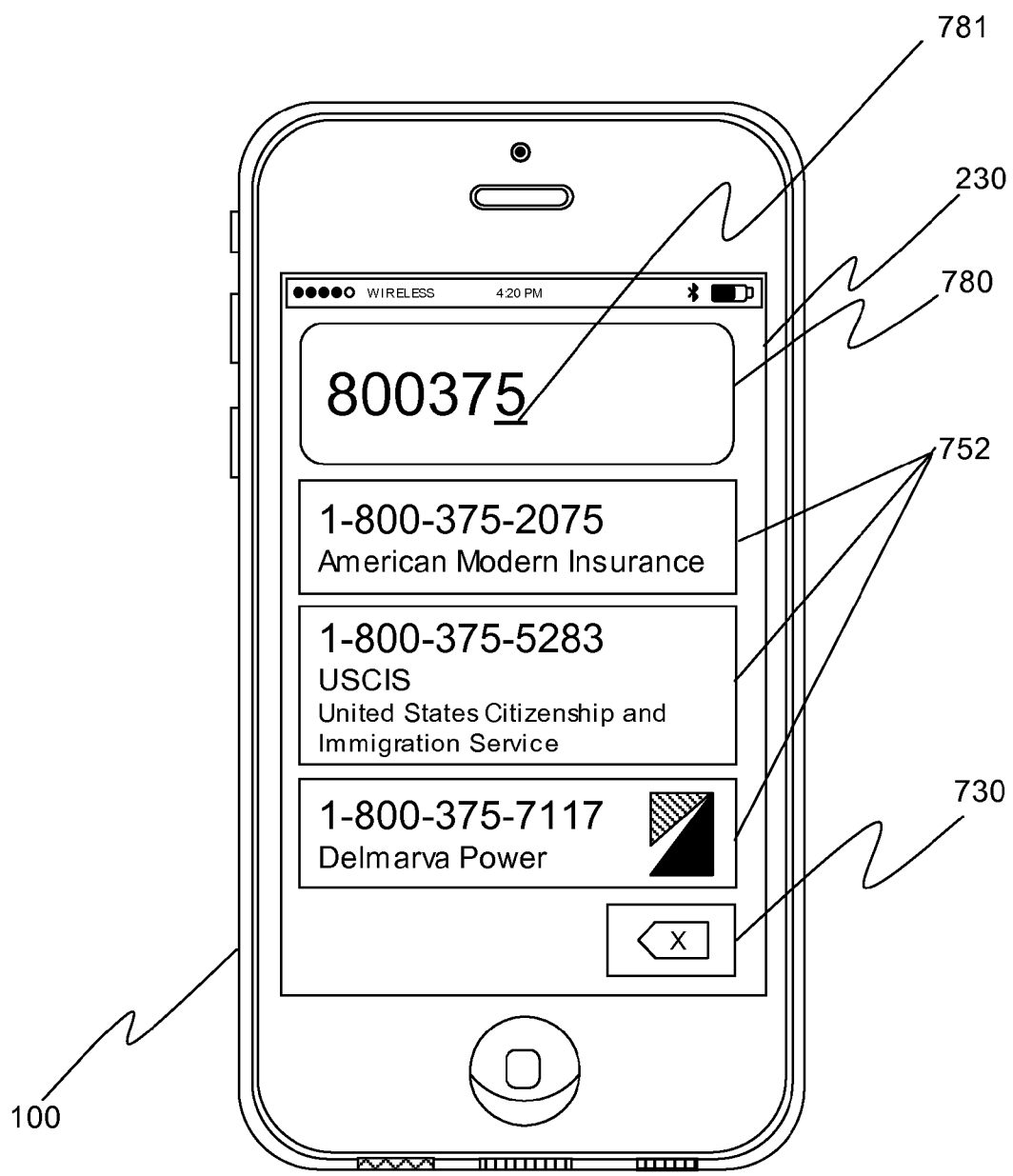
FIG. 10 illustrates the appearance of a smartphone screen after user input representing a portion of a desired number to call has been recognized according to an embodiment of the method of the invention.

An example of a screen display corresponding to this step 350 is illustrated in FIG. 10. In this illustration, the six digits 8 0 0 3 7 5 have been entered by the user, and are displayed in the upper portion 780 of the touchscreen display 230, with the cursor 781 under the most recently entered digit. In this example, it is assumed that the system finds three matching phone trees stored in the IVR database 777 that correspond to these initial 6 digits. These are displayed as distinct fields 752 in the display 230, one for each of the matching IVR database entries. The fields may be simple text and numbers, or may also include various images, thumbnail files or corporate logos in the display. Each field 752 represents a virtual "button" that can be pressed to select the corresponding phone tree. In this illustration, the matching entries are listed in numeric order by the Top Tier entry (the phone number) for the phone tree. If there are too many entries for convenient display within the screen, a standard "scroll bar" for the display may also be used, to allow the user to scroll down a long list of entries. In some embodiments, the matching entries may be listed in alphabetical order according to the metadata associated with the phone tree. The "Back" button 730 may be used to return to the keypad entry screen to enter more digits if too many matches for convenient selection have been found.

Returning to FIG. 4, the next step 360 comprises accepting entry data 361 from the user, in the form or "pressing" the "button" for one of the phone tree options displayed. The next step 362 checks if the "Back" "button" was the input, and if so, the program returns the display to the input screen represented by the keypad entry step 330.

However, if the result of this selection step 360 is that one of the phone tree options has been selected, the next step 370 comprises loading the phone number corresponding to the Top Tier of that phone tree option into the Dialer Field 800. The dialer field 800 may be a separate memory register designated by the app specifically for this purpose, or in some embodiments may be a designated string variable within the program.

Figure 11:
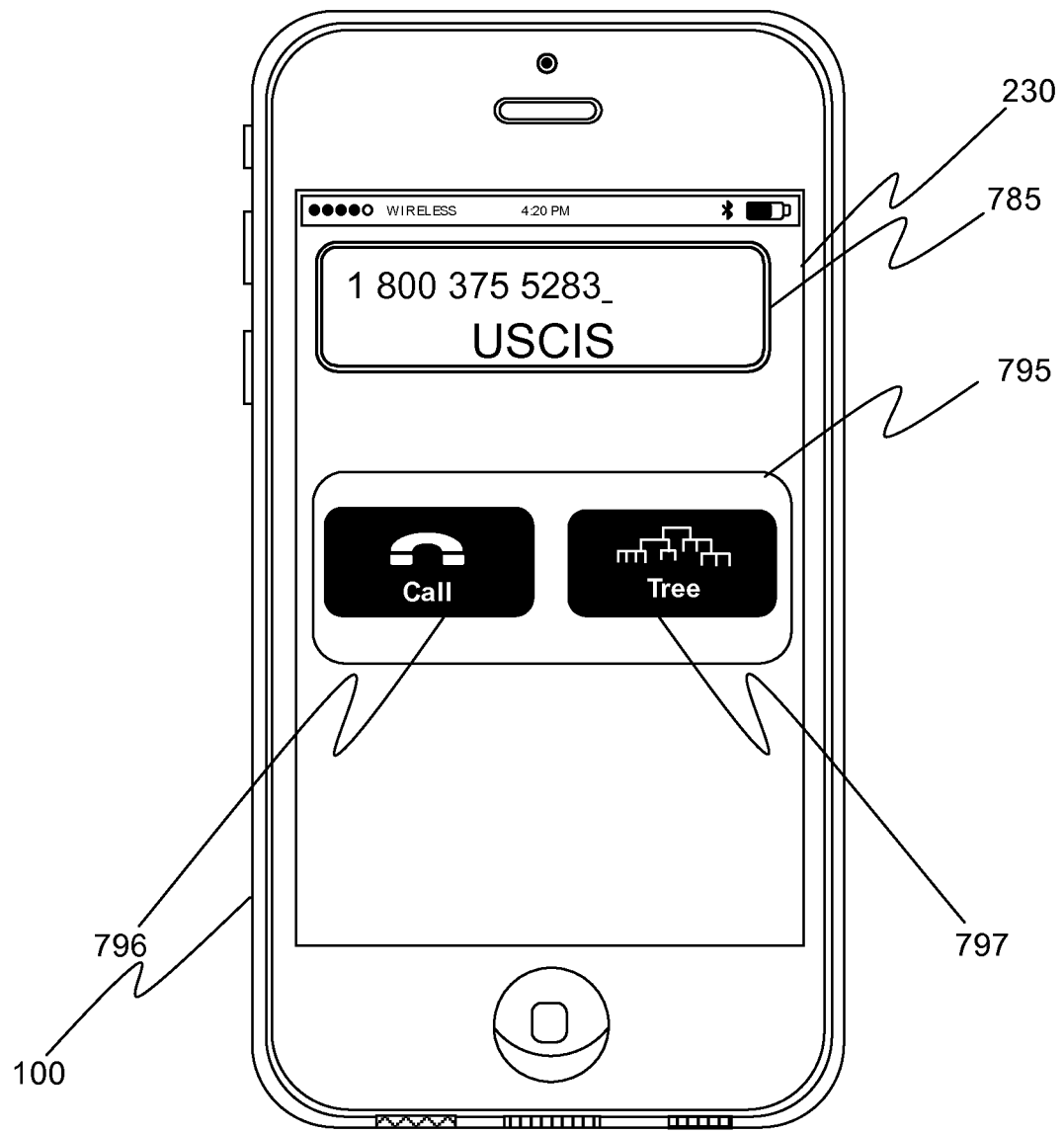
FIG. 11 illustrates the appearance of a smartphone screen after the user has selected a phone tree (the USCIS phone tree) for further exploration according to an embodiment of the method of the invention.

After the phone tree has been selected and the data for the phone tree Top Tier loaded into the Dialer Field, in the next step 380 the phone screen is changed to now display the contents of the Dialer Field 800. An example of a screen display corresponding to this step is illustrated in FIG. 11, which shows the contents of the Dialer Field 800 in a portion 785 of the touchscreen display 230 in the upper part of the screen, and also comprising in this embodiment a pop-up screen 795 containing two "buttons" 796 & 797, with one "button" 796 giving the user the option to "Call" the number as loaded into the dialer field, and the other "button" 797 marked "Tree" that allows the user to continue building the number based on the phone tree. Various techniques, such as a change in the size, shape, color, font, graphic selections etc. may be used to allow the user to recognize that the contents of the portion of the display 785 showing the contents of the Dialer Field 800 is from the IVR database 777 and not the same display as the user input display 780, even though the actual digits may be the same or similar to those displayed in the input screen 780.

Returning to FIG. 4, the next step 390 comprises accepting entry data 391 from the user, in the form or "pressing" one of the two "buttons" displayed—"Call" or "Tree". If the choice is to "Call", the program passes control to steps represented by "D" in FIG. 4, which initiate the phone and call the number in the dialer field, and are illustrated in detail in FIG. 7. If the choice is "Tree", the program passes control to steps represented by "B" in FIG. 4, which allow the user to continue to build the number in the dialer field, and are illustrated in detail in FIG. 5.

Figure 5:
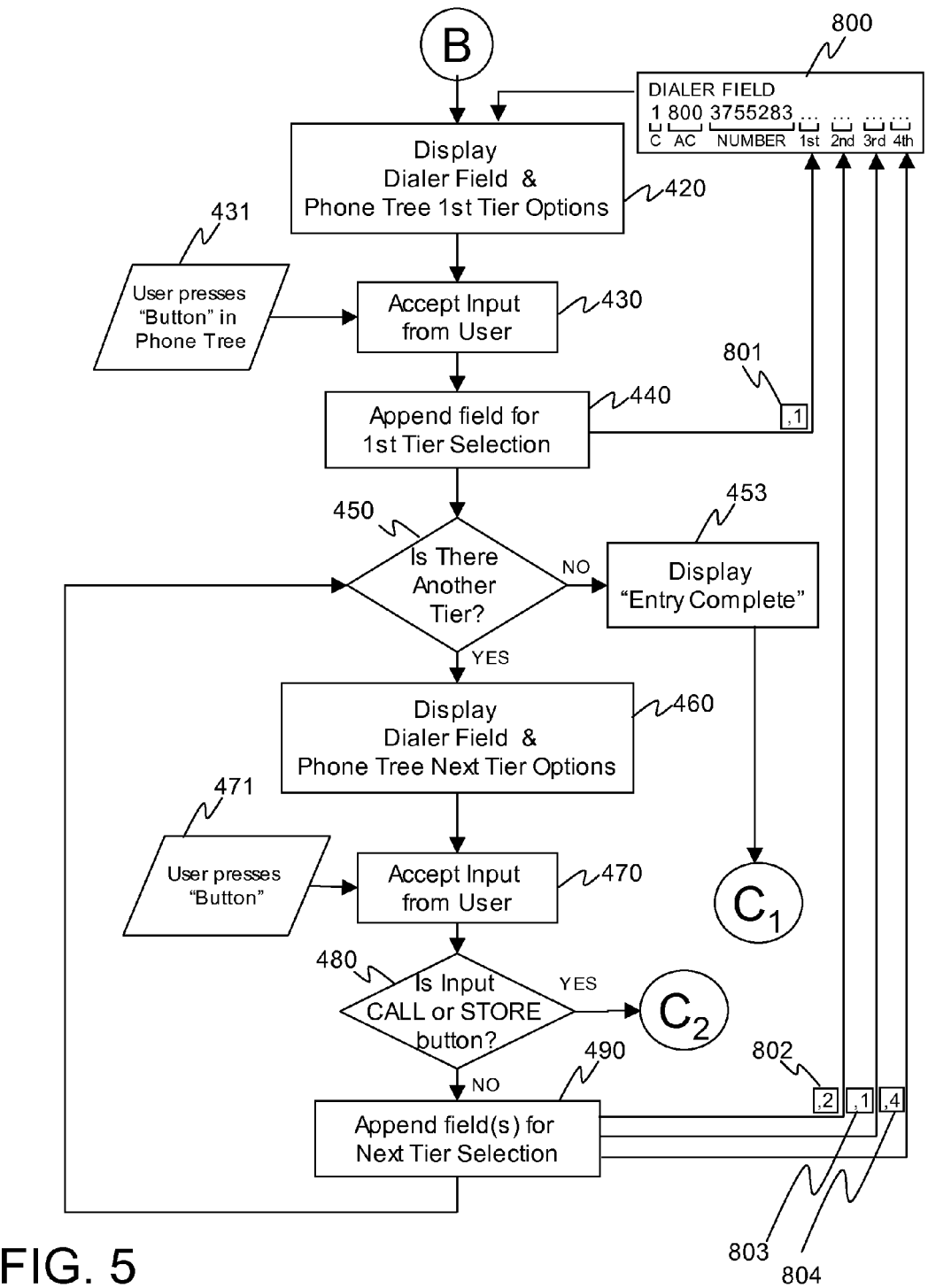
FIG. 5 presents a flowchart with the second set of steps that will be executed by a smartphone app according to an embodiment of the method of the invention.

Turning now to FIG. 5, after the "Tree" option has been selected, as mentioned above, program passes control to steps presented here that allow the user to continue to build the number in the Dialer Field 800. The next step 420 is to display the dialer field along with the 1$^{st}$ Tier options for the phone tree.

Figure 12:
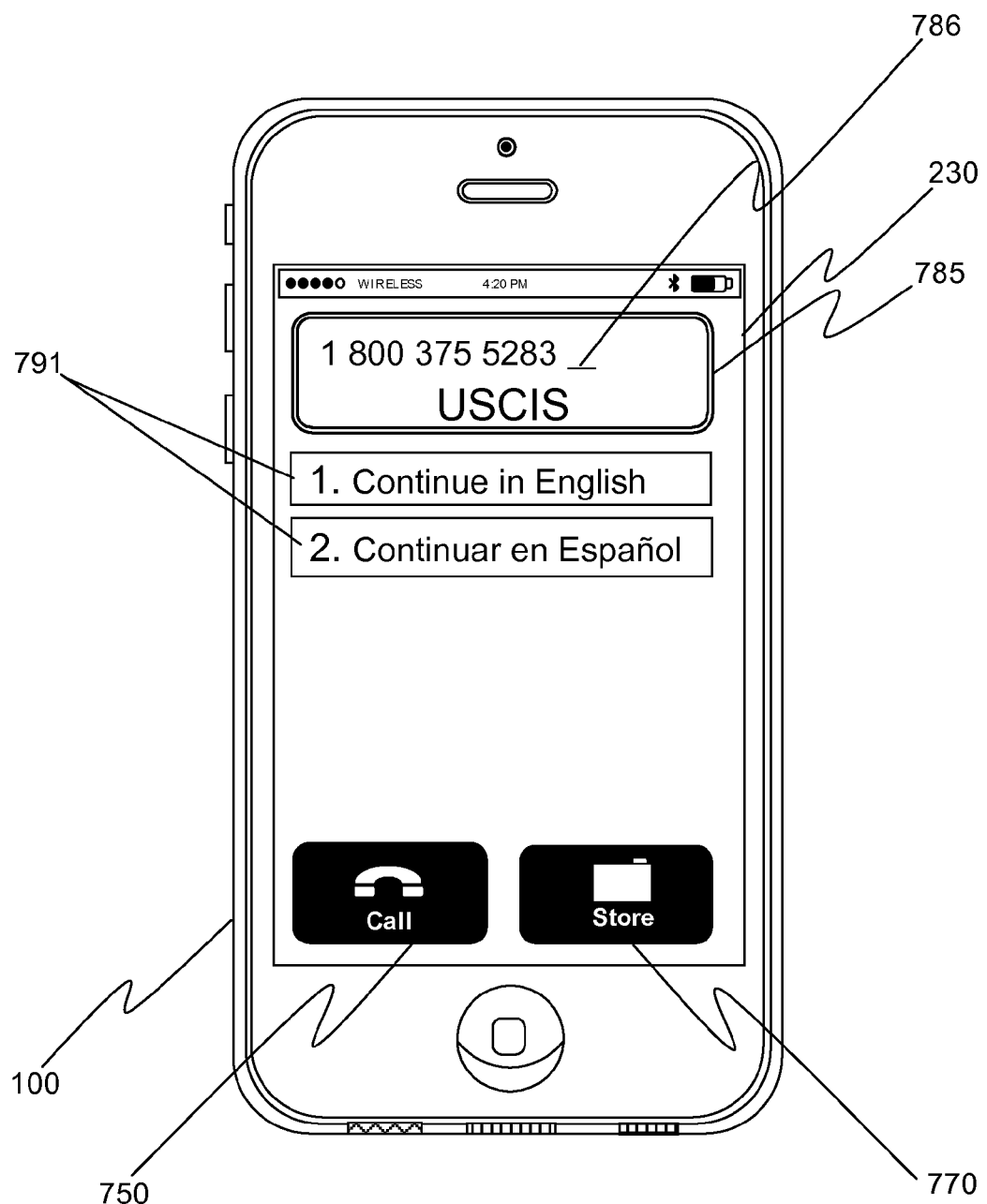
FIG. 12 illustrates the appearance of a smartphone screen displaying the $1^{st}$ Tier options of the USCIS phone tree according to an embodiment of the method of the invention.

A typical screen display corresponding to this step is illustrated in FIG. 12. The upper part 785 of the touchscreen display 230 illustrates the contents of the Dialer Field 800, but now are illustrated with a cursor 786 which may optionally be blinking or otherwise indicating that the software is now accepting input from the user. The location of the cursor 786 may be used to illustrate the Tier from which the options are being selected. In some embodiments, a more specific designation of the Tier of the Phone Tree may be provided, such as a heading such as "1$^{st}$ Tier" to label the options presented. In this illustration, the two 1$^{st}$ Tier Options 791 from the USCIS Phone Tree are presented as "buttons" that may be "pressed" by the user to select the additional material that will be added to the contents of the Dialer Field 800.

Returning to FIG. 5, the next step 430 comprises accepting entry data 431 from the user, in the form or "pressing" one of the "buttons" displayed for the 1$^{st}$ Tier phone tree options. For the example illustrated in FIG. 1 and Table I (the USCIS phone tree), as well as the illustration in FIG. 12, the 1$^{st}$ Tier Options 011 are:

1. To continue in English.
 2. Para continuar en Español.

After one of these options has been selected, the next step 440 generates a first data string 801 corresponding to the digits to be appended to the Dialer Field 800, typically represented by one or more commas (depending on the length of pause needed for the IVR system) and the digit of the selection. For the example of the USCIS phone tree, selecting the option of "1. To Continue in English" will append the bit stream ", 1" 801 to the number in the dialer field.

Once the 1st Tier bit stream selection 801 has been appended to the Dialer Field 800, the next step 450 determines if there is an additional tier of options in the selected phone tree. If there are no options for additional tiers available under the selection made for the 1st Tier, the next step 453 may be an optional display of a message to the user that the "Entry is Complete", or that "All Tiers Filled", and the program passes control to steps represented by "$C_1$" in FIG. 5 that conclude the interaction with the stored Phone Tree, and which are illustrated in detail in FIG. 6.

However, if there are additional options for tiers available, the next step 460 is to display the present contents of the Dialer Field 800 along with the next Tier options for the phone tree.

Figure 13:
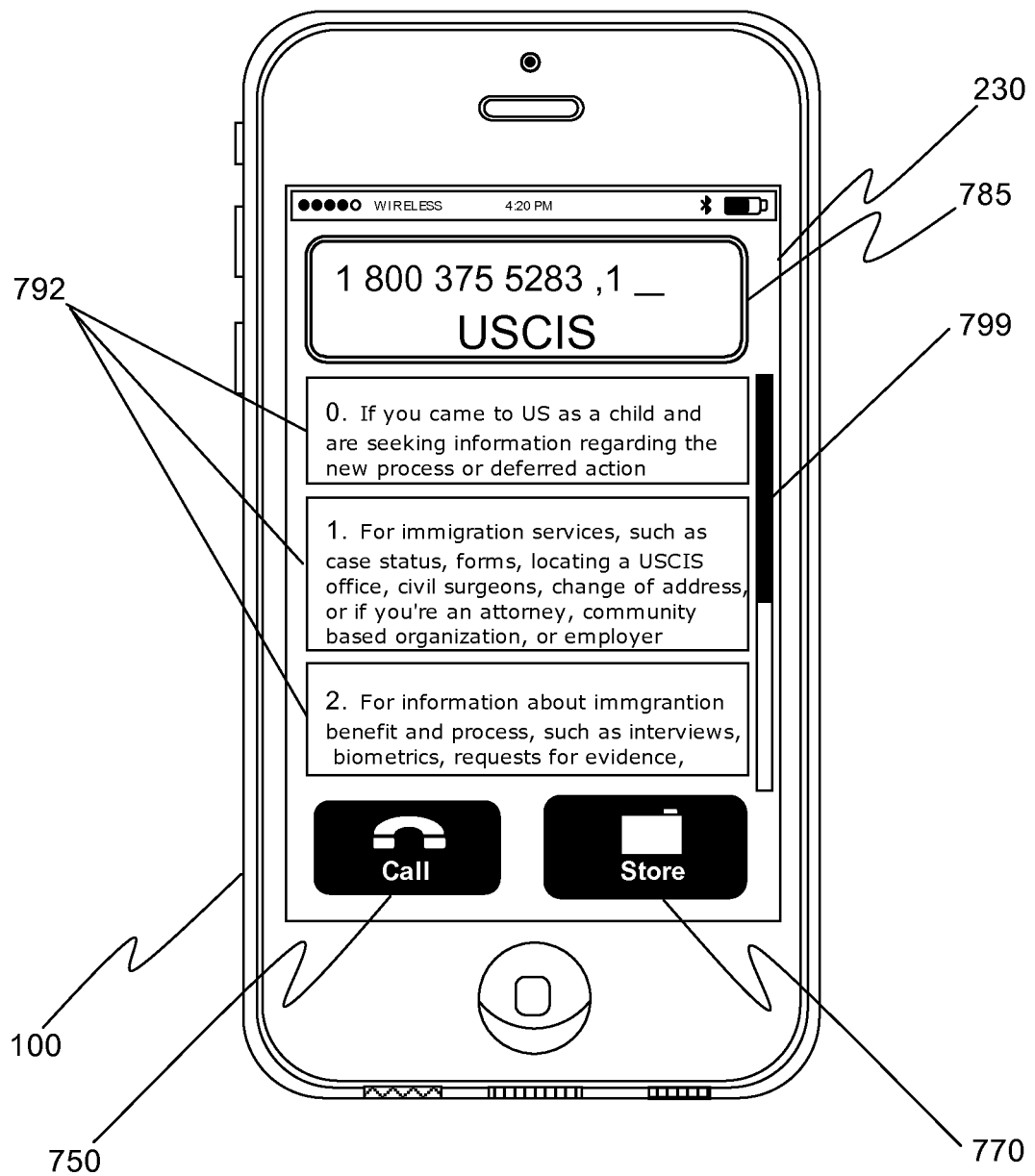
FIG. 13 illustrates the appearance of a smartphone screen displaying the $2^{nd}$ Tier options of the USCIS phone tree according to an embodiment of the method of the invention.

A typical smartphone screen display corresponding to this step for the 2nd Tier options for the USCIS Phone Tree is illustrated in FIG. 13. The upper part of the display 785 again illustrates the contents of the Dialer Field 800, which now have the 1st Tier input appended, so the cursor 786 is now placed at the location where the 2nd Tier bit stream will be appended. In some embodiments, a more specific designation of the Tier of the Phone Tree may be provided, such as a heading such as "2nd Tier" to label the options presented. In this illustration, three of the six 2nd Tier Options 792 from the USCIS Phone Tree are presented as "buttons" that may be "pressed" by the user to select the additional material that will be added to the contents of the Dialer Field 800. A partly filled scroll bar 799 is also illustrated to the right of the options, indicating that there are more 2nd Tier options that may be made visible by using the scroll controls typical for this smartphone operating system.

For the example illustrated in FIG. 1 and Table I (the USCIS Phone Tree), as well as the illustration in FIG. 13, the 2nd Tier Options 021 are:

0. If you came to US as a child and you're seeking information regarding the new process for deferred action . . . .
1. For immigration services, such as case status, forms, locating a USCIS office, civil surgeons, change of address, or if you're an attorney, community based organization, or employer . . . .
2. For Information about immigration benefits and processes, such as interviews, biometrics, requests for evidence, background checks or processing times . . . .
3. For Information about special programs and other resources, such as the Kaplan class action lawsuit, temporary protected status, the Freedom of Information Act, Privacy Act, or to report an immigration scam . . . .
4. If you are experiencing technical difficulty with the electronic immigration system . . . .
6. For information about the new process to apply for a provisional unlawful presence waiver . . . .

The IVR option 9 for the 2nd Tier, which gives the caller the option to repeat the menu options, is not presented in the visual phone tree, since the parallel presentation of options in the visual IVR system eliminates the need to hear a menu again.

Returning again to FIG. 5, the next step 470 comprises accepting entry data 471 from the user, in the form or "pressing" one of the "buttons" displayed for the phone tree options, or "pressing" the "button" representing the "Call" option or the "button" representing the "Store" option. In the next step 480, if either the "Call" or "Store" option has been selected, the program passes control to steps represented by "$C_2$" in FIG. 5 that complete the creation of the number in the Dialer Field 800, and which are illustrated in detail in FIG. 6. However, if one of the 2nd Tier phone tree options has been selected, then the next step 490 generates a second data string 802 corresponding to the required digits to be appended to the phone number in the Dialer Field 800, typically represented by one or two commas (depending on the length of pause needed for the IVR system) and the digit of the selection. For the example of the USCIS phone tree, selecting the option "2. For Information about immigration benefits and process, such as interviews, biometrics, requests for evidence, background checks or processing times . . ." will append the bit stream, ", 2" 802 to the number in the dialer field.

Once the 2nd Tier option 802 has been selected and appended to the Dialer Field 800, the program proceeds back to the step 450 to determine if there is an additional tier of options in the selected phone tree. If there are no options for additional tiers available under the selection made for the 2nd Tier, the next step 453 may be an optional display of a message to the user that the "Entry is Complete", or that "All Tiers Filled", and the program passes control to steps represented by "$C_1$" in FIG. 5 that conclude the use of the Phone Tree, and which are illustrated in detail in FIG. 6. However, if there are additional options for tiers available, the next step 460 is to display the dialer field along with the next Tier options for the phone tree.

For the example illustrated in FIG. 1 and Table I (the USCIS phone tree), the 3rd Tier Options 031 after option 1 for the 1st Tier and 2 for the 2nd Tier have been selected are:

1. For general filing information . . . .
2. If you currently have a pending case, and want general information about interview or biometric appointments, requests for evidence, background checks, or case processing times . . . .
3. For information about approved, denied, or rejected cases . . . .
4. To hear current priority dates for immigrant visa and the availability of diversity lottery numbers . . . .

The subset of repeating options 037 (corresponding to entering 7 or 9) are not presented in this list, since the parallel presentation of options in the visual IVR system eliminates the need to hear a menu again.

The next step 470 comprises accepting entry data 471 from the user, in the form or "pressing" one of the "buttons" displayed for the phone tree options, or "pressing" the "button" representing the "Call" option or the "button" representing the "Store" option. In the next step 480, if either the "Call" or "Store" option has been selected, the program passes control to steps represented by "$C_2$" in FIG. 5 that complete the creation of the number in the Dialer Field 800, and which are illustrated in detail in FIG. 6. However, if one of the 3rd Tier phone tree options has been selected, then the next step 490 generates a third data string 803 corresponding to the required digits to be appended to the phone number in the Dialer Field 800, typically represented by one or two commas (depending on the length of pause needed for the IVR system) and the digit of the selection. For the example of the USCIS phone tree, selecting the option of "1. For general filing information" will append the bit stream, ", 1" 803 to the number in the dialer field.

Once the 3rd Tier option 803 has been selected and appended to the Dialer Field 800, the program proceeds back to the step 450 to determine if there is an additional tier of options in the selected phone tree. If there are no options for additional tiers available under the selection made for the 3rd Tier, the next step 453 may be an optional display of a message to the user that the "Entry is Complete", or that "All Tiers Filled", and the program passes control to steps represented by "$C_1$" in FIG. 5 that conclude the use of the Phone Tree, and which are illustrated in detail in FIG. 6. However, if there are additional options for tiers available, the next step 460 is to display the dialer field along with the next Tier options for the phone tree.

For the example illustrated in FIG. 1 and Table I (the USCIS phone tree), the 4$^{th}$ Tier Options 041 after option 1 for the 1$^{st}$ Tier, 2 for the 2$^{nd}$ Tier and 1 for the 3$^{rd}$ Tier have been selected are:

1. For filing information about naturalization . . . .
2. For permanent residents . . . .
3. For US Citizens
4. For refugees and asylees
5. For employers and investors . . . .
6. For non-immigrants . . . .

The set of repeating options 047 (corresponding to entering 7, 8, or 9) are not presented in this list, since the parallel presentation of options in the visual IVR system eliminates the need to hear a menu again.

The next step 470 comprises accepting entry data 471 from the user, in the form or "pressing" one of the "buttons" displayed for the phone tree options, or "pressing" the "button" representing the "Call" option or the "button" representing the "Store" option. In the next step 480, if either the "Call" or "Store" option has been selected, the program passes control to steps represented by "C$_2$" in FIG. 5 that complete the creation of the number in the Dialer Field 800, and which are illustrated in detail in FIG. 6. However, if one of the 4$^{th}$ Tier phone tree options has been selected, then the next step 490 generates a fourth data string 804 corresponding to the required digits to be appended to the phone number in the Dialer Field 800, typically represented by one or two commas (depending on the length of pause needed for the IVR system) and the digit of the selection. For the example of the USCIS phone tree, selecting the option of "4. Refugees and Asylees" will append the bit stream, ", 4" 804 to the number in the dialer field.

Once the 4$^{th}$ Tier option 804 has been selected and appended to the Dialer Field 800, the program proceeds back to the step 450 to determine if there is an additional tier of options in the selected phone tree. If there are no options for additional tiers available under the selection made for the 4$^{th}$ Tier, the next step 453 may be an optional display of a message to the user that the "Entry is Complete", or that "All Tiers Filled", and the program passes control to steps represented by "C$_1$" in FIG. 5 that conclude the use of the Phone Tree, and which are illustrated in detail in FIG. 6. However, if there are additional options for tiers available, the next step 460 is to display the dialer field along with the next Tier options for the phone tree. For the example of the USCIS phone tree, there are at most 4 Tiers, so the program will proceed to the concluding options, indicated by "C$_1$" and illustrated in FIG. 6.

Figure 6:
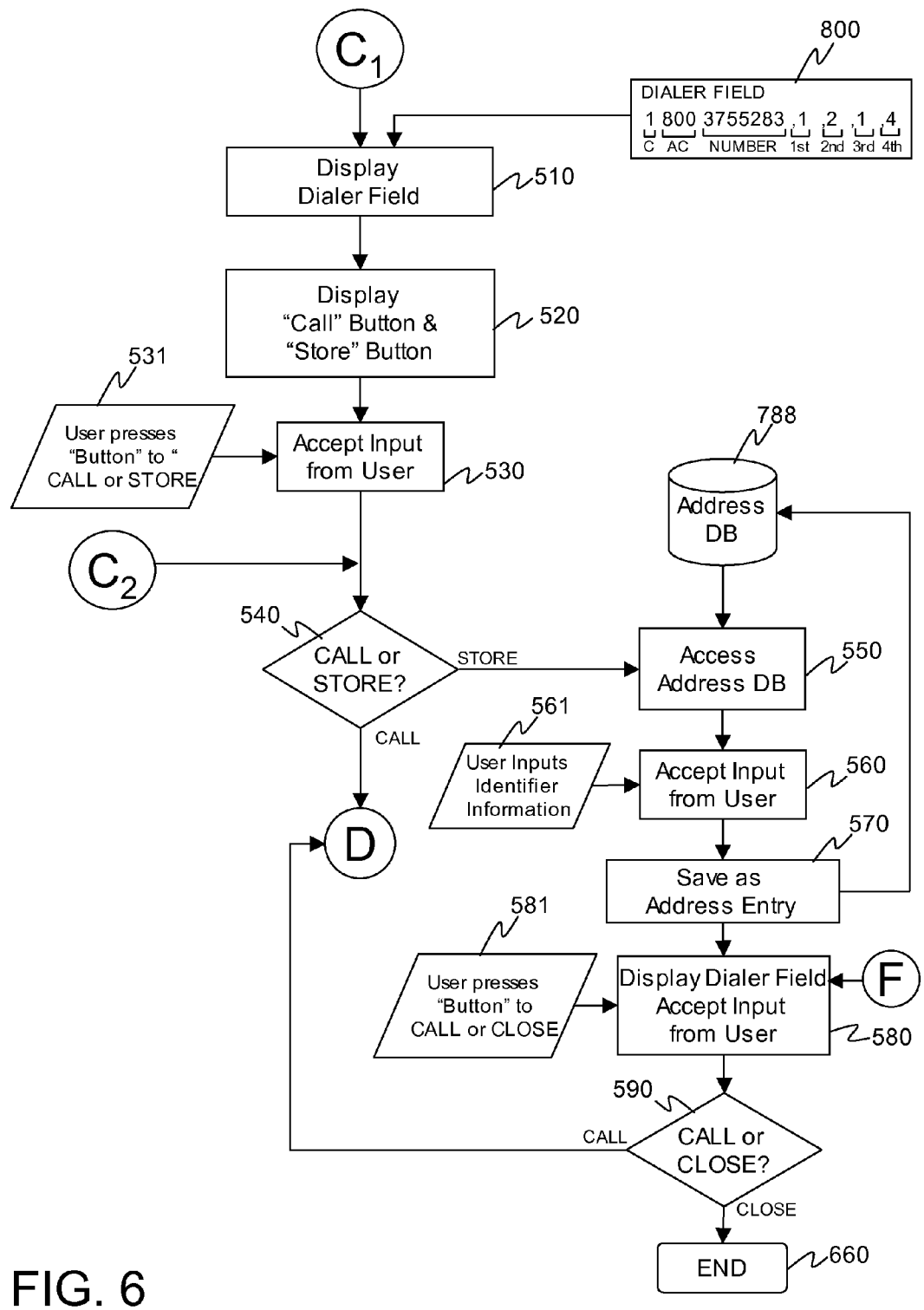
FIG. 6 presents a flowchart with the third set of steps that will be executed by a smartphone app according to an embodiment of the method of the invention.

Turning now to FIG. 6, if either all Tiers have had bit streams appended to the Dialer Tree 800, or the "Call" or "Store" options have been selected, the program passes control to steps presented here. If the Dialer Field has been completed (for the USCIS example presented here, the number in the Dialer Field 800 will now consist of the dialstring "1,8003755283,1,2,1,4" representing the number to call to provide access for filing information for Refugees and Asylees), the next step 510 is to display the assembled number in the Dialer Field 800. This step, or an additional step 520, may also present the "Call" or "Store" options (as was illustrated in FIGS. 12 and 13) to the user options for the user as "buttons".

Figure 14:
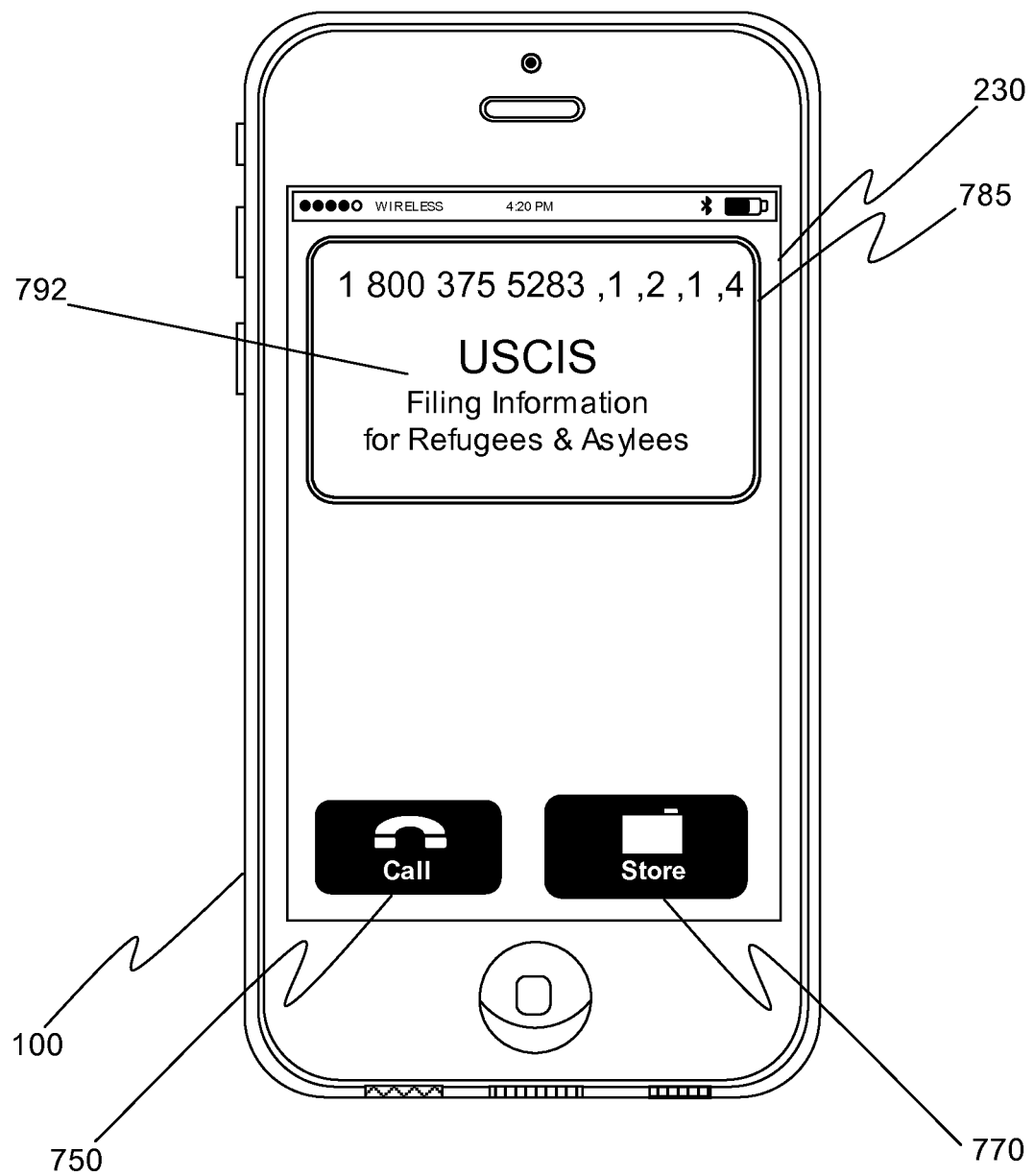
FIG. 14 illustrates the appearance of a smartphone screen after the user has completed several selections of options for the USCIS phone tree according to an embodiment of the method of the invention.

A typical smartphone screen display corresponding to this step for the USCIS Phone Tree is illustrated in FIG. 14. The upper part of the display 785 again illustrates the contents of the Dialer Field 800, which is now complete with 1$^{st}$, 2$^{nd}$, 3$^{rd}$ and 4$^{th}$ Tier input appended, so there is no cursor displayed. The "Call" and "Store" "buttons" 750 and 770 are also present, allowing the user to either invoke the phone operations using the number in the Dialer Field 800, or to store the contents of the Dialer Field 800 for future use.

Returning to FIG. 6, the next step 530 comprises again accepting input 531 from the user, in the form or "pressing" one of the "buttons" displayed.

This now places the software in a similar state to that invoked by pressing the "Call" or "Store" buttons in input step 480 of FIG. 5. In next step 540, if the "Call" option has been selected either as an option 480 during the construction of the Dialer Field 800, or after all Dialer Field options have been exhausted, the control of the program branches to the dialing options, indicated by "D" in FIG. 6, and illustrated in more detail in FIG. 7.

If the "Store" option has been selected, in the next step 550 the program provides access to a database, such as a typical address database 788 provided with smartphones, for storing the assembled phone number in the Dialer Field 800. The next step 560 comprises accepting input 561 from the user, typically in the form of identifying information to be recorded as metadata about the phone number, such as an organization name and/or department. In the next step 570, both the number from the Dialer Field and the entered metadata 561 may be stored in the address database 788. For the example previously illustrated, the address database may store the dial-string "1,8003755283,1,2,1,4" along with identifying information such as "USCIS Refugee Info." entered by the user.

Once the data is stored, the program proceeds to the next step 580 in which the Dialer Field is displayed and the user has the option to "Call" the assembled number in the Dialer Field, or to "Close" the app. These options for the user will be presented as "buttons". In this example, the options are to "Call" using the number in the Dialer Field 800, or to "Close" the app.

This step 580 then accepts input 581 from the user, in the form or "pressing" one of the "buttons" displayed. In the next step 590, if the "Call" option has been selected, the program branches to the dialing options, indicated by "D" in FIG. 6, and illustrated in more detail in FIG. 7. If the "Close" option has been selected, in the next step 660 the program returns to the initial dialer screen 310, as was illustrated in FIG. 8 or, in some embodiments, may simply shut down the app, returning the phone to the home screen, as was illustrated in FIG. 3.

Figure 4:
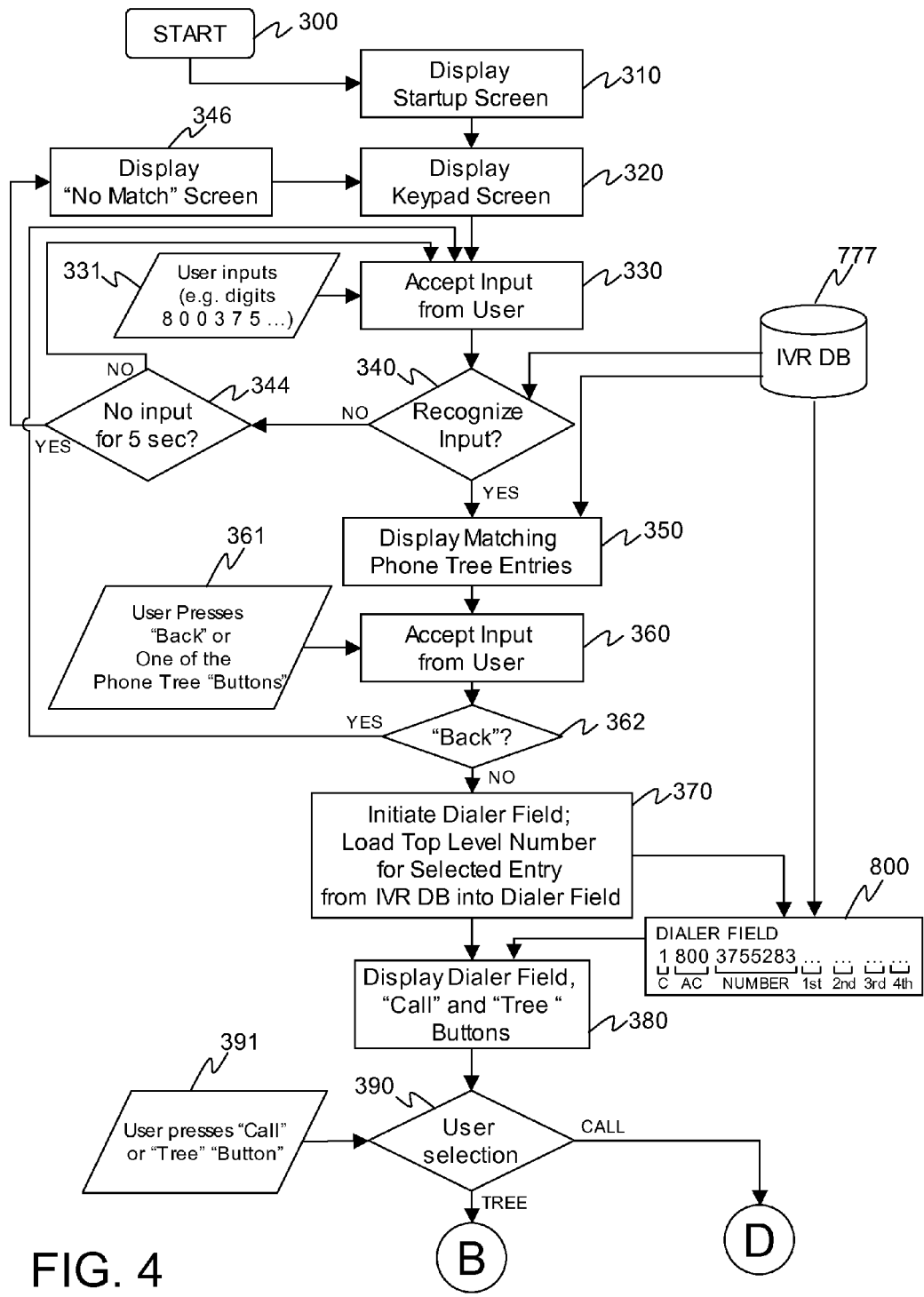
FIG. 4 presents a flowchart with the first set of steps that will be executed by a smartphone app according to an embodiment of the method of the invention.
Figure 7:
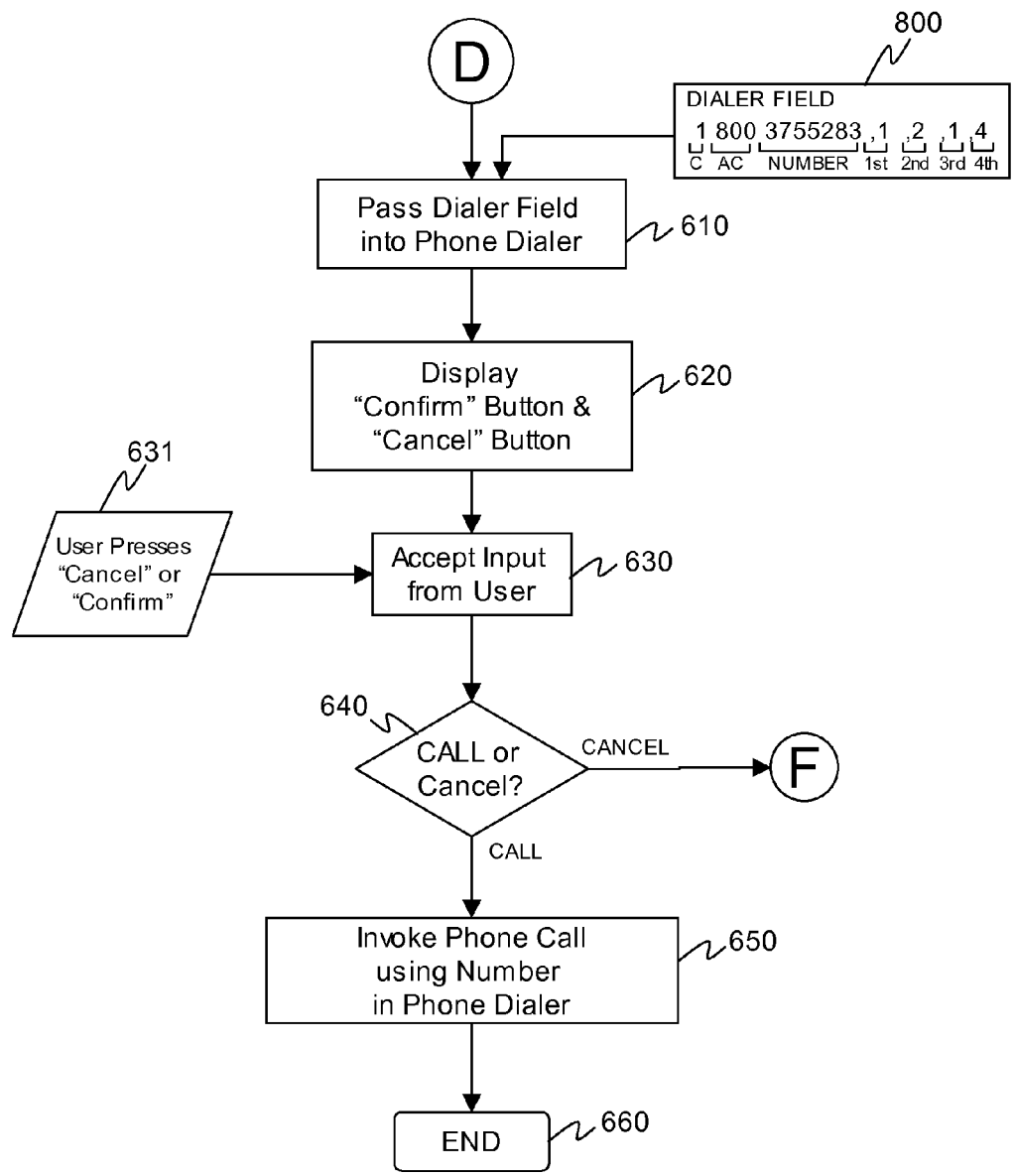
FIG. 7 presents a flowchart with the fourth set of steps that will be executed by a smartphone app according to an embodiment of the method of the invention.

Turning now to FIG. 7, which represents the steps indicated by the "D" noted in FIGS. 4 and 6. Once the Dialer Field 800 has had the number assembled, the next step 610 is to take the assembled dialstring from the Dialer Field 800 and pass it to the phone dialer. This will invoke the standard phone dialing commands packaged within the operating system of the smartphone, and will make the phone call through the transceiver built within the smartphone. In some embodiments, once the call is completed, the control of the phone will be returned to the app, which has remained operational in the background. The phone call will then display a closing screen, which may say "Thank you for making your call with Visual IVR", and present the user with options to "Make another call", or to "Close" the app In other embodiments, the app will close once the dialstring has been constructed and transferred to the phone dialer, and when the call is done, the phone will return to the smartphone's home state.

In the next step 620, the normal dialing interface is displayed with two "buttons" provided as options: "Confirm" or "Cancel". The next step 630 comprises accepting input 631 from the user, in the form or "pressing" one of the "buttons" displayed.

In the next step 640, the program interprets this input. If the "Cancel" "button" was selected, the program passes control as indicated by the "F" noted in FIG. 7 and reverts to the "Call" or "Close" options indicated the prior step 580 in FIG. 6 (and, since the user chooses not to call, presumably the user would immediately select the "Close" option).

However, if the "Confirm" "button" has been selected, in the next step 650 the phone connection is initiated using standard commands in the smartphone operating system API and the number from the Dialer Field 800 is dialed. The number will reach the desired phone tree, and the appended suffixes with their suitably attached "pauses" (represented by commas) will reach the selected entry in the phone tree with no need to listen repeatedly to complex options or wait to manually enter digits after listening to a message.

With the initiation of the phone call in this step 650, the creation of the dialstring by the app is done. In some embodiments, in the final step 660, the app reverts to a standby state in the background while the phone call proceeds, and once the end of the call is detected, reverts to the initial start screen 310 as shown in FIG. 8. In other embodiments, the app remains operating in the background, but the smartphone displays the home screen for the smartphone.

IV. A Second Phone Tree Embodiment: Graphical Option Selection

A. The GEICO Phone Tree.

In the First Embodiment presented above, the user makes selections through displays on the phone in the order that they would be made if the user were listening to the phone tree—first, a $1^{st}$ Tier selection is made, followed by a $2^{nd}$ Tier selection, followed by a $3^{rd}$ Tier selection, etc. until the user proceeds to dial, or the options are exhausted.

Figure 15A:
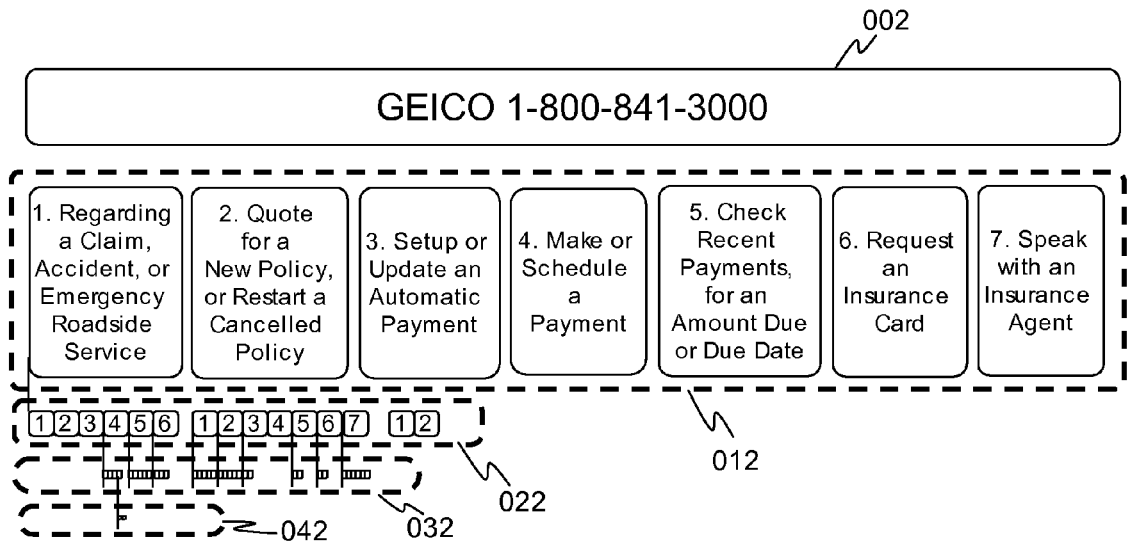
FIG. 15A illustrates the Phone Tree for GEICO Insurance.
Figure 15B:
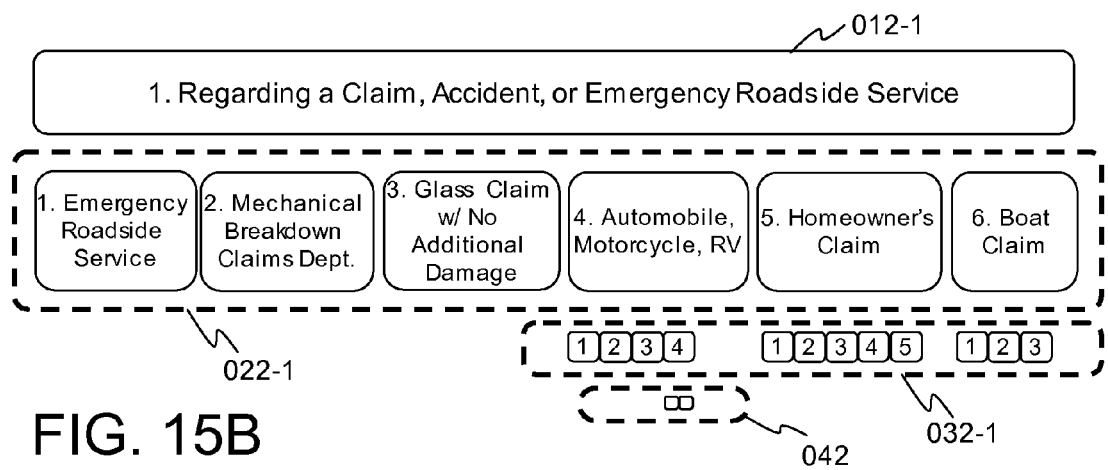
FIG. 15B illustrates a subset of the options under one of the $1^{st}$ Tier selections for the Phone Tree for GEICO Insurance.
Figure 15C:
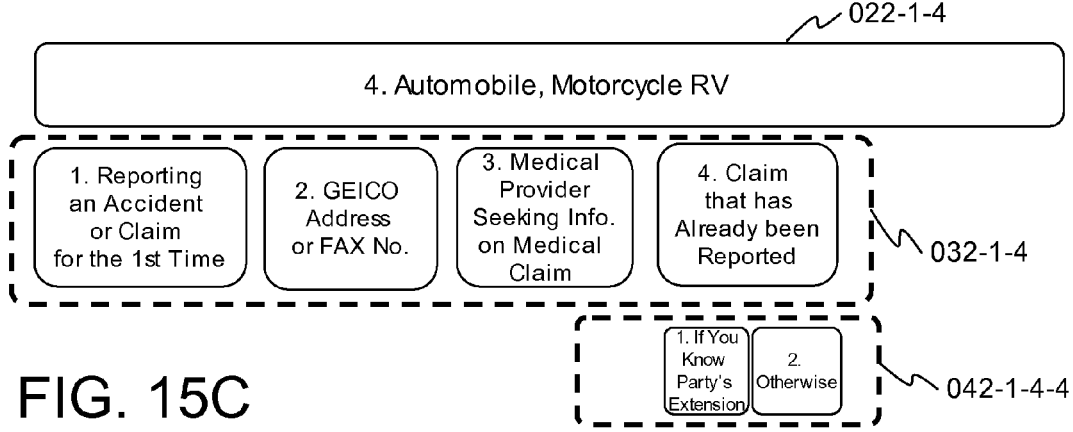
FIG. 15C illustrates a subset of the options under one of the $2^{nd}$ Tier selections for the Phone Tree for GEICO Insurance.

This type of iterative selection is useful if the options are lengthy or complex and do not lend themselves to simple graphical display on a smartphone screen. However, not all phone trees have entries that are this complex. Table II (in 3 parts) presents an example for a phone tree for GEICO Insurance. As before, there are several tiers to the phone tree. However, most of these entries are considerably shorter than the options in the USCIS phone tree. FIGS. 15A, 15B, and 15C present these same tiers of options for GEICO Insurance in a graphical illustration.

Referring to Table II and FIG. 15A, in the Top Tier 002, the direct dial phone number is represented. This usually comprises a country code (in the case of the US, the single digit "1"), followed by a 3-digit Area Code (in this case, the toll free indicator "800"), a 3-digit prefix (in this case, "841") and a 4-digit number (in this case, "3000").

In the $1^{st}$ Tier 012, the first set of options presented to the caller is shown. In the case of the GEICO Phone Tree, as listed in Table II, there are seven $1^{st}$ Tier options to choose from. Of these, options 0, 4, 5, 6, and 7 have no additional Tiers beneath them. Option 0, to repeat the present menu, is not illustrated in FIG. 15A.

In the $2^{nd}$ Tier 022, the further options provided once one of the $1^{st}$ Tier options has been selected are shown. As listed in Table II, up to nine options are possible: 0, 1, 2, 3, 4, 6, 7 and #. Note that a subset of the $2^{nd}$ Tier options will be uniform options no matter what 2nd Tier option has been selected: "0" will cause the immediate 2nd Tier message to be repeated, and "#" returns to the previous tier (in this case, to the $1^{st}$ Tier). These uniform options have not been included in the illustration of FIG. 15A.

TABLE II

| GEICO Top Tier: 1-800-841-3000 |
| --- |
| $1^{st}$ Tier  $2^{nd}$ Tier  $3^{rd}$ Tier  $4^{th}$ Tier |
| GEICO Phone Tree (Part 1). |
| 1. If you're calling in regard to a claim, an accident, or emergency roadside service<br>    Please have your policy or claim number ready.<br>        1. For emergency road service . . .<br>        2. For our mechanical breakdown claims department not involving an accident . . .<br>        3. For a glass claim with no additional damage . . .<br>        4. For an automobile, motorcycle, or RV claim<br>            1. If you are reporting accident or claim for first time . . .<br>            2. If you would like the GEICO mailing address or fax number<br>                The address for claims is:<br>                GEICO<br>                1 GEICO West<br>                PO Box 509119<br>                San Diego, CA 92150-9119<br>                The Fax number is 619-819-4004<br>                Please include the adjuster's name and the<br>                claim number on all correspondence.<br>                0. To repeat this menu<br>                #. To return to the prior menu<br>            3. If you are a medical provider seeking information on a medical claim<br>            4. If you are calling about a claim that has already been reported<br>                1. If you know your party's extension or<br>                last name<br>                2. Otherwise . . .<br>                #. To return to the prior menu<br>        0. To repeat this menu<br>        #. To return to the prior menu<br>    5. For a homeowners claim<br>        1. For a Travelers Claim<br>        2. For a Liberty Mutual Claim<br>        3. For a Fidelity Claim<br>        4. For an AFI claim<br>        5. For other homeowner claims |

TABLE II-continued

GEICO Top Tier: 1-800-841-3000

1st Tier  2nd Tier  3rd Tier  4th Tier

0. To repeat this menu
            #. To return to the prior menu
        6. For a boat claim
            1. If you have a ski safe policy or policy begins with S.
            2. For a seaworthy policy, or if policy begins with BSP
            3. For Travelers
            0. To repeat this menu
            #. To return to the prior menu
        0. To repeat this menu
        #. To return to the prior menu
2. If you would like a quote for a new policy or to restart a cancelled policy . . .
    1. To insure your personal auto
        2. If you or spouse are active duty, guard, reserve or retired military
        3. If you have had a policy with GEICO in past 6 months
        4. For an existing GEICO policy
        5. If you have already received a quote
        6. All others . . .
        0. To repeat this menu
        #. To return to the prior menu GEICO Phone Tree (part 2).

2. If you would like a quote for a new policy . . . (cont.)
    2. For business or commercial insurance
        1. If you are calling to obtain insurance for fewer than 5 business vehicles
        2. In you need insurance for more than 5 business vehicles
        3. For business or professional liability
        4. For business property
        5. For workers compensation
        0. To repeat this menu
        #. To return to the prior menu
    3. For motorcycle or ATV insurance
        1. If you've had a GEICO motorcycle or ATV policy that has been
        cancelled within in last 6 months
        2. For a quote on new motorcycle or ATV policy
        #. To return to the prior menu
    4. For home or renter's insurance
        Please enter your property's Zip Code . . .
            1. For home, renters or condo insurance
            2. For mobile home insurance
            3. For flood insurance
            9. To repeat these options
            #. To return to the prior menu
    5. For watercraft including boats or jet skis
        1. If you are calling about a previous quote
        2. If you are calling about a new quote
        #. To return to the prior menu
    6. For RV or travel-trailer insurance
        1. If you're an existing GEICO auto or RV policy holder, or if you've had a
        GEICO policy in the last 6 months
        2. For a quote on a new RV or travel-trailer policy
        #. To return to the prior menu
    7. For a quote for a new policy for other products
        1. For a new umbrella policy
        2. For a flood policy
        3. For identity theft protection
        4. For antique or collector cards
        5. For snowmobiles
        6. For term life insurance
        7. For other products
        0. To repeat this menu
        #. To return to the prior menu
    0. To repeat this menu
    #. To return to the prior menu
3. To setup or update an automatic payment
    1. To setup or update a debit or credit card account
    2. To setup or update a checking account
    #. To return to the prior menu
4. To make or schedule a payment GEICO Phone Tree (Part 3).

5. To check recent payments, current amount due, or due date
6. To request an insurance card
7. To speak with a professional insurance agent for service on an existing policy
0. To repeat this menu In the $3^{rd}$ Tier 032, the further options provided once one of the $2^{nd}$ Tier options has been selected are shown. The number of options varies, depending on the $2^{nd}$ Tier selection made. If "1" was selected as the $2^{nd}$ Tier option, there are no additional $3^{rd}$ Tier options unique to "1" in the $2^{nd}$ Tier—selecting option "1" in this case makes a direct connection to Emergency Roadside Service. However, if "4" was selected as the $2^{nd}$ Tier option, the $3^{rd}$ Tier options, as listed in Table II, are 0, 1, 2, 3, 4 and #. The relationships between options in the Tiers are represented in FIG. 15A by vertical lines. Note that, as listed in Table II, a subset of the $3^{rd}$ Tier options will be uniform options no matter what $3^{rd}$ Tier option has been selected: "0" will cause the immediate $2^{nd}$ Tier message to be repeated, and "#" returns to the previous tier (in this case $2^{nd}$ Tier). These uniform options have not been included in the illustration of FIG. 15A.

Likewise, in the $4^{th}$ Tier 042, the further options provided once one of the $3^{rd}$ Tier options has been selected are shown. Only a selection of "4" in the $3^{rd}$ Tier leads to additional options in $4^{th}$ Tier, and in this case, as listed in Table II, the $4^{th}$ Tier options are 0, 1, 2 and #. Note that a subset of the $4^{th}$ Tier options will be uniform options no matter what $4^{th}$ Tier option has been selected: "0" will cause the immediate $4^{th}$ Tier message to be repeated, and "#" returns to the previous tier (in this case, to the $3^{rd}$ Tier). These uniform options have not been included in the illustration of FIG. 15A.

The relative simplicity of the entries in this phone tree makes it amenable to representation as a graphical object, similar to the representation in FIGS. 15A, 15B and 15C. In FIG. 15A, the GEICO Top Tier is represented by a single long rectangle 002 stretching across the entire graphical representation. Underneath this single Top Tier representation 002 is a set of seven smaller rectangles 012, representing the $1^{st}$ Tier options. Underneath the $1^{st}$ Tier options 012 are a set of rectangles 022 representing the $2^{nd}$ Tier options, with a subset of rectangles of the set 022 beneath each corresponding $1^{st}$ Tier option. Underneath the $2^{nd}$ Tier options 022 are a set of squares 032 representing the $3^{rd}$ Tier options, with a subset of rectangles of the set 032 beneath each corresponding $2^{nd}$ Tier option. Underneath the $3^{rd}$ Tier options 032 are a set of dots 042 representing the $4^{th}$ Tier options, with a subset of dots of the set 042 beneath each corresponding $3^{rd}$ Tier option.

In this representation, details for the $1^{st}$ Tier options are shown, but only numbers for the $2^{nd}$ Tier options are displayed, and detail for the $3^{rd}$ and $4^{th}$ Tiers cannot be seen at all. However, using standard prior art programming interfaces, such as the standard user interface commands for zoom (e.g. pinch-to-zoom, scroll bars, +/−zoom controls) for the graphic display, the detail displayed in a graphical display is allowed to scale and become visible or hidden as the image is magnified or demagnified.

FIG. 15B illustrates a zoomed version of the options for the $1^{st}$ Tier selection of "1" 012-1, in which the $2^{nd}$ Tier options 022-1 are now large enough to be legible, and the entry information can now be legibly displayed. In this case, however, only the numbers for the $3^{rd}$ Tier options 032-1 are displayed, and the detail of the $4^{th}$ Tier 042 still cannot be seen.

Again using built-in zoom functions for the graphic information, this detail can be made visible. FIG. 15C illustrates a zoomed version of the options for the $2^{nd}$ Tier selection of "4" 022-1-4, in which the $3^{rd}$ Tier options 032-1-4 are now large enough to be legible. In this case, the entries for the $4^{th}$ Tier options 042-1-4-4 are also displayed, since there are only two that need to be displayed at the same time. If more $4^{th}$ Tier options existed, further detail could be viewed by additional graphical zooming.

IV. A Second Phone Tree Embodiment: Graphical Option Selection
B. Description of the Embodiment.

Many of the steps that will be executed in an embodiment of the invention using a graphical phone tree will be similar or the same as the steps executed for the detailed phone tree, as already described. As in the previous embodiment, illustrated in FIG. 4, the software begins execution with the initial step by the user "pressing" the smartphone icon for the app, noted as the "Start" step 300. This typically involves loading the program steps into active memory, and their execution by the microprocessor built into the smartphone.

The initial steps of this embodiment will follow the steps already presented in FIG. 4, in which the user inputs digits or characters until they are recognized as corresponding to a phone tree whose data has been stored in the IVR database 777. However, in this embodiment, instead of the program steps passing control to the steps represented in FIG. 4 by "B" and further illustrated in FIG. 5, at this same step (marked "B" in FIG. 4), the program passes control to code that executes the steps indicated by the character "$B_1$", which are illustrated in FIG. 16.

Figure 16:
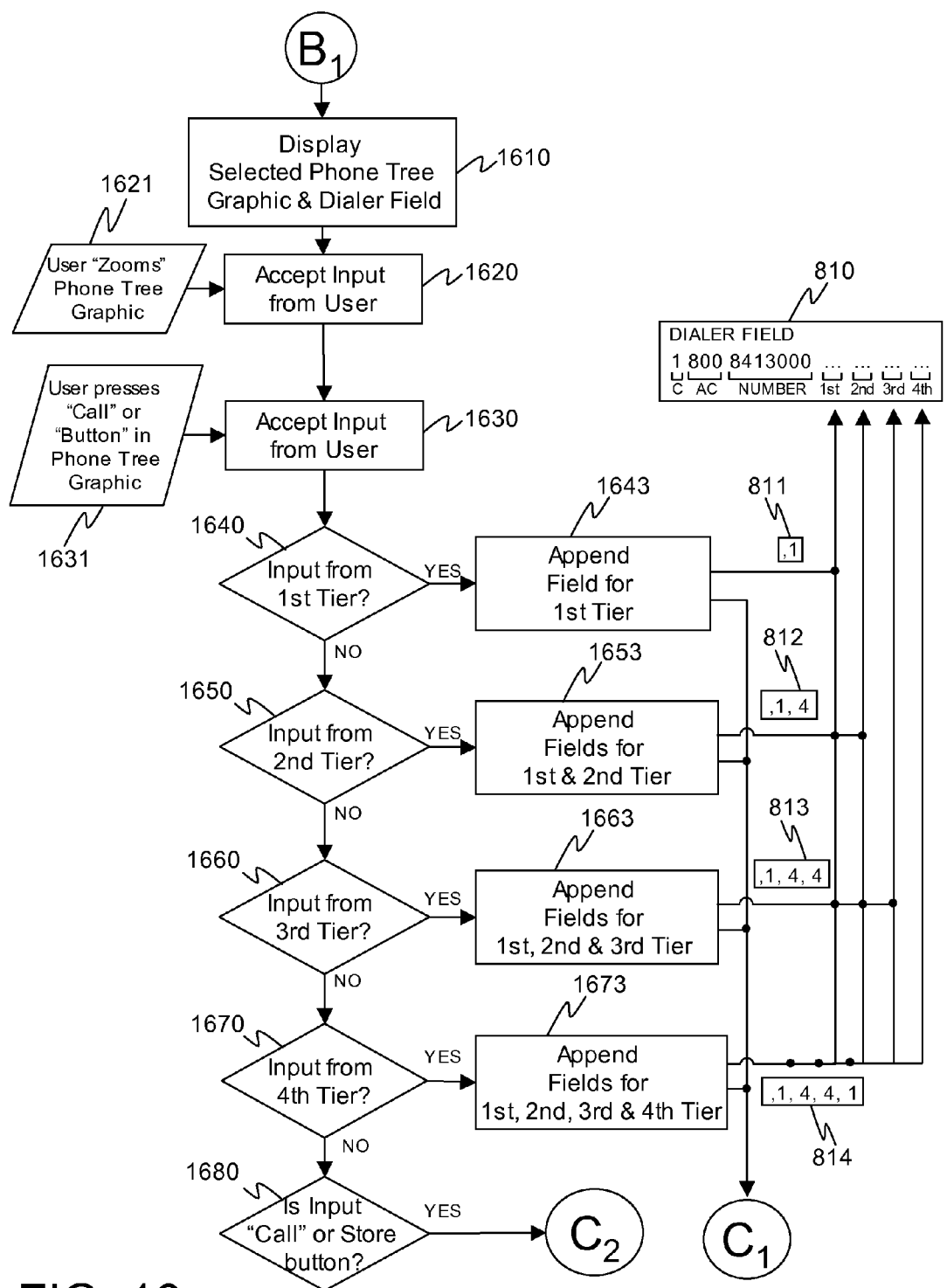
FIG. 16 presents a flowchart with the second set of steps that will be executed by a smartphone app according to an embodiment of the method of the invention using a graphical phone tree display.

Turning now to FIG. 16, in the next step 1610 of this embodiment, the display will show the Dialer Field along with the graphic representation of the Phone Tree. The graphic display will be configured as a set of dynamically sized objects that can act as "buttons", such that when an image of a "button" on the display is larger than a predetermined amount, it becomes active as an input designator. Techniques for creating a zoomed display of a graphic representation of a dataset, and user interactions with the display using, for example, a "two-finger" zoom technique, are common in mapping and other smartphone apps, and will be known to those skilled in the art.

The next step 1620 is to accept user input 1621 moving within and "zooming" the graphic on the display, which the user will do to explore the phone tree until the desired option is identified and made large enough to become an active "button". This designation of active or inactive may be made by any number of common techniques, such as the a change of color or contrast for the font in the "button" text (e.g. having text for an inactive "button" be represented as grey, while text for an active "button" be designated as black) or by having a graphic designator, such as an outline or a change in color intensity, appear as the "button" becomes active.

Figure 17:
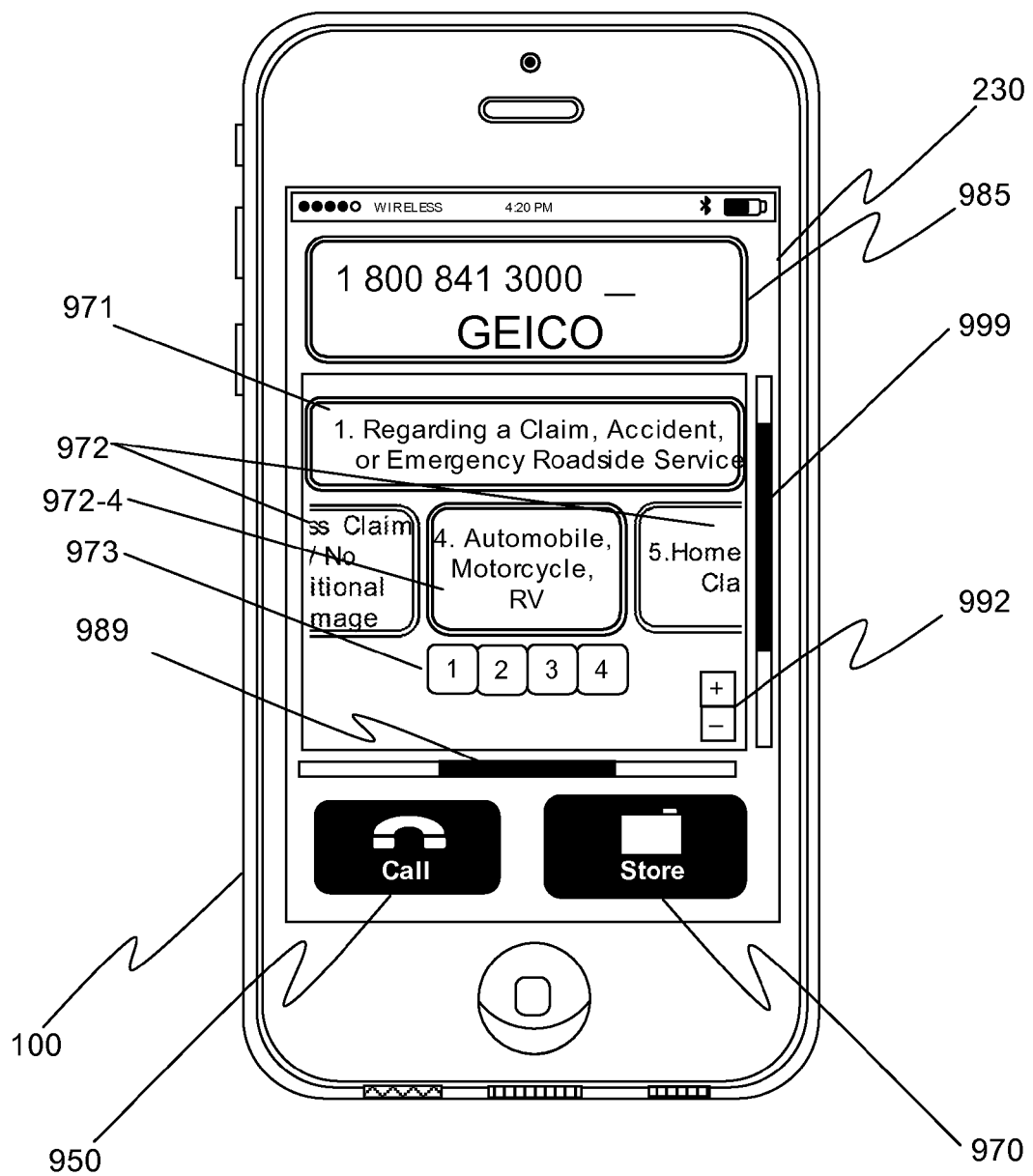
FIG. 17 illustrates the appearance of a smartphone screen executing the second set of steps of an embodiment of the method of the invention using a graphical phone tree display.

FIG. 17 illustrates a smartphone with the display showing an example of a graphic interface for the Phone Tree according to the invention at this step 1620 of the flow of FIG. 16. The example used for this illustration is a portion of the GEICO Phone Tree as was shown in Table II and FIGS. 15A, 15B, and 15C. The smartphone display 230 shows a graphic representation 971 for one of the $1^{st}$ Tier options (in this example, option "1"), graphic representations (or portions thereof) 972, 972-4 for three of the $2^{nd}$ Tier options below the displayed $1^{st}$ Tier option 971. Below the displayed $2^{nd}$ Tier option 972-4 (which is labeled "4. Automobile, Motorcycle, RV"), the display also shows a graphic representation 973 for four of the $3^{rd}$ Tier options. The larger graphical representations 971, 972, 972-4 are shown with double-lined borders as an example of an indication that they are "active", i.e. can be "pressed" to make a selection, while the smaller graphical representations for the $3^{rd}$ Tier options 973 are shown with a single border to indicate they are too small to be "active".

Because this graphic display is intended to be "zoomed" to allow the user to identify their selection, various options to facilitate zooming may also be added to the display. A graphic to allow control of zooming functions, such as the box pair 992 marked with "+" and "−" is a common interface for a zoom command. A vertical scroll bar 999 and a horizontal scroll bar 989 are also shown as possible interface graphics to allow navigation within the graphical object. Zoom control and navigation may also be achieved using various "two-finger" interactions such as a touchscreen "pinch-zoom" (moving two touched points closer or farther apart on the touchscreen to zoom in or out), or by various "hold-and-move" techniques for interacting with the screen for navigation.

Also displayed are "Call" and "Store" "buttons" 950 and 970, analogous to those described in the previous embodiment.

Returning to FIG. 16, once the user has identified the desired selection in the phone tree, in the next step 1630, the user "presses" the "button", generating an input signals 1631 that is interpreted by the program. The interpretation will typically follow a sequence of decision steps, examining the input and analyzing the nature of the data stream. Such a decision tree may follow the steps described below.

In the first decision step 1640, the program determines if the "button" pressed is in the $1^{st}$ tier of the phone tree. If the answer is YES, in the next step 1643 the phone tree appends a string of bits 811 corresponding to the $1^{st}$ tier digits (as illustrated for the GEICO tree, $1^{st}$ Tier selection is "1" corresponds to "Regarding a Claim", and the appended bits will typically represent a comma and a "1" (,1). For some phone trees, appending two commas (,,1) or more may be needed to accommodate predictable delays in the phone tree response time. Once the string of bits 811 has been appended to the dialer field, the software can proceed to the steps indicated by "$C_1$" in FIG. 16, and that correspond to the steps already illustrated in FIGS. 6 and 7 of the previous embodiment.

If the answer to step 1640 is NO, the program proceeds to the second decision step 1650.

In the second decision step 1650, the program determines if the "button" pressed is in the $2^{nd}$ tier of the phone tree. If the answer is YES, in the next step 1653 the phone tree appends a string of bits 812 corresponding to the $2^{nd}$ tier digits (as illustrated for the GEICO tree, $1^{st}$ Tier selection "1" corresponds to "Regarding a Claim" and $2^{nd}$ Tier selection "4" corresponds to "Automobile, Motorcycle, or RV", and the appended bits will typically represent a comma and a "1" followed by a comma and a "4" (, 1, 4). For some phone trees, appending two commas (,, 1,, 4) or more may be needed to accommodate predictable delays in the phone tree response time. Once the string of bits 812 has been appended to the dialer field, the software can proceed to the steps indicated by "$C_1$" in FIG. 16, and that correspond to the steps already illustrated in FIGS. 6 and 7 of the previous embodiment.

Figure 18:
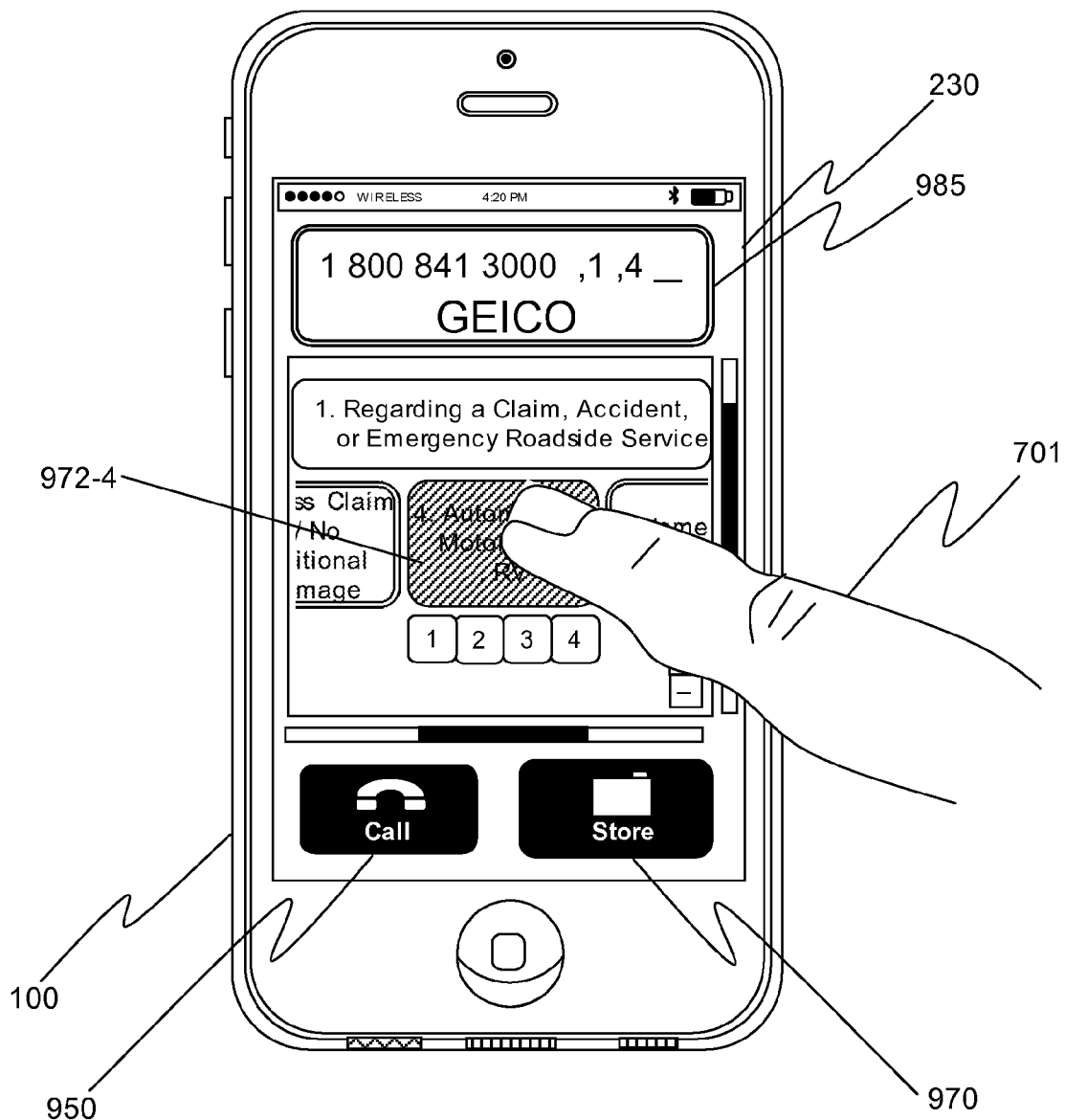
FIG. 18 illustrates a user generating input using a smartphone during the second set of steps of a second embodiment of the method of the invention using a graphical phone tree display.

An example of a selection made at the $2^{nd}$ Tier is illustrated in FIG. 18. The Phone Tree, in this example the GEICO Phone Tree of Table II and FIGS. 15A, 15B, and 15C, is illustrated, and the user's finger 701 is pressed against a selected "button", in this case a $2^{nd}$ Tier selection 972-4. The number in the display 985 corresponding to the Dialer Field has been updated with the bit stream ",1,4" to reflect the selection.

If the answer to step 1650 is NO, the program proceeds to the third decision step 1660.

Returning to FIG. 16, in the third decision step 1660, the program determines if the "button" pressed is in the $3^{rd}$ tier of the phone tree. If the answer is YES, in the next step 1663 the phone tree appends a string of bits 813 corresponding to the $3^{rd}$ tier digits (as illustrated for the GEICO tree, $1^{st}$ Tier selection "1" corresponds to "Regarding a Claim", $2^{nd}$ Tier selection "4" corresponds to "Automobile, Motorcycle, or RV" and $3^{rd}$ Tier selection "4" corresponds to "Claim has been Reported", and the appended bits will typically represent a comma and a "1" followed by a comma and a "4" followed by another comma and a "4" (,1,4,4). For some phone trees, appending two commas (,, 1,, 4,, 4) or more may be needed to accommodate predictable delays in the phone tree response time. Once the string of bits 813 has been appended to the dialer field, the software can proceed to the steps indicated by "$C_1$" in FIG. 16, and that correspond to the steps already illustrated in FIGS. 6 and 7 of the previous embodiment.

If the answer to step 1660 is NO, the program proceeds to the fourth decision step 1670.

In the fourth decision step 1670, the program determines if the "button" pressed is in the $4^{th}$ Tier of the phone tree. If the answer is YES, in the next step 1673 the phone tree appends a string of bits 814 corresponding to the $4^{th}$ Tier digits (as illustrated for the GEICO tree, $1^{st}$ Tier selection "1" corresponds to "Regarding a Claim", $2^{nd}$ Tier selection "4" corresponds to "Automobile, Motorcycle, or RV", $3^{rd}$ Tier selection "4" corresponds to "Claim has been Reported" and $4^{th}$ Tier selection "1" corresponds to "Party's Extension Known", and the appended bits will typically represent a comma and a "1" followed by a comma and a "4" followed by another comma and a "4" followed by another comma and a "1" (,1,4,4,1). For some phone trees, appending two commas (,, 1,, 4,, 4,, 1) or more may be needed to accommodate predictable delays in the phone tree response time. Once the string of bits 814 has been appended to the dialer field, the software can proceed to the steps indicated by "$C_1$" in FIG. 16, and that correspond to the steps already illustrated in FIGS. 6 and 7 of the previous embodiment.

If the answer to step 1670 is NO, the program proceeds to the fifth decision step 1680.

In the fifth decision step 1580, the program determines if the "button" pressed is the "Call" "button" or the "Store" "button". If the answer is YES, in the next step the options represented by "$C_2$" as illustrated in FIG. 6 and then FIG. 7 are executed, and the software proceeds to make a call using the steps as described in the previous embodiment.

In this example, the five options representing the 4 tiers, as well as an option to "Call" or "Store", are the only input options presented to the user. If none of the options are selected, the software will wait until one of the options is selected. In some variants of this embodiment, if no input is received within a certain predetermined time period, a message may be displayed, optionally along with a sound cue, asking the user to make a selection. In some variants of this embodiment, if no selection is made even after prompting, the program may cancel or shut down, or revert to the initial input state represented by startup step 310 of FIG. 4.

Other variations may be known or derived by those skilled in the art. For example, after a $1^{st}$ Tier "button" is pressed, the program may be designed to display a portion of the graphical phone tree with only the $2^{nd}$ or $3^{rd}$ Tier sub-options under the selected $1^{st}$ Tier option displayed as active. The user may then select one of these options as appropriate. In some cases, such as in the GEICO phone tree under $1^{st}$ Tier option "2" followed by $2^{nd}$ Tier option "4", the phone tree requires a zip code to be entered, so the program may be designed to display an additional input field to allow the input of a string of digits or letters. In some cases, the program may be designed to display an "Additional Input?" message, with "Yes" or "No" options that allow additional selections to be made.

V. Variations of the Embodiments

Two embodiments for the creation of a dialstring have been disclosed in this Application, one with step-by-step navigation through complex options for a phone tree, the other with navigation by means of a graphical interface. Other embodiments and implementations of the invention will be apparent to those skilled in the art.

One option that may be particularly useful is that of using the visual IVR interface as a replacement for a translation service, by providing the guidance and direction for a Phone Tree in one language with menu choices or descriptions in the graphical representations presented in a different language. This can be especially practical for users who struggle to hear or understand the spoken options presented the IVR system, but may be able to carry on an appropriate conversation once they have found the right option.

Figure 19:
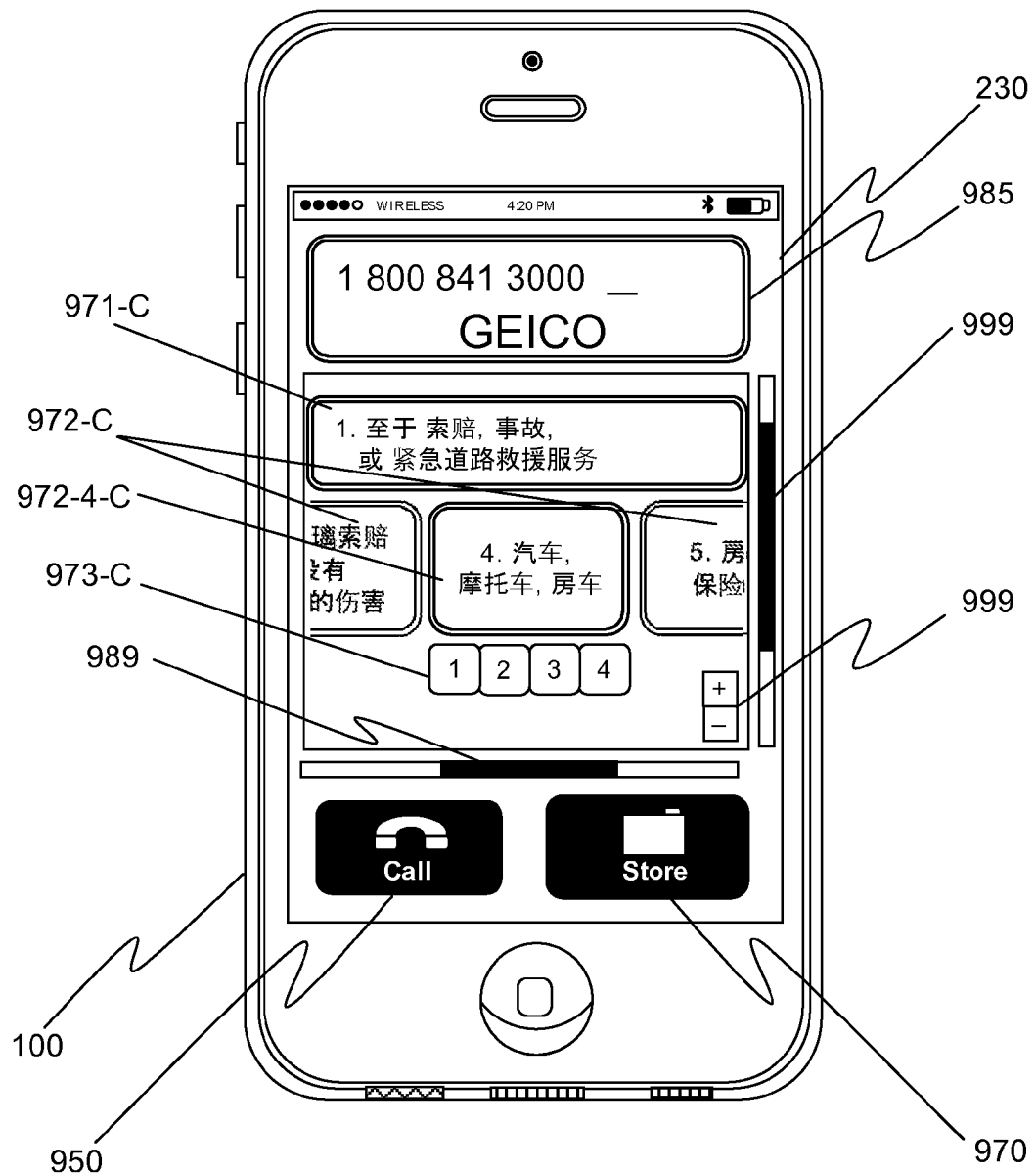
FIG. 19 illustrates the appearance of a smartphone executing the second set of steps of a second embodiment of the method of the invention, using a graphical display in a language different from the language used in the Phone Tree.

As an example, although the phone tree itself is the same, a graphical representation in another language may allow a speaker of a foreign language to select options more readily. This is illustrated in FIG. 19, in which the options of the GEICO Phone Tree as were shown in FIG. 17 are shown, but with the text presented in Chinese (and with reference characters modified by appending "-C" when compared with the reference characters of FIG. 17). Although the ensuing call may still need to take place in English, the ability to navigate to the correct option may be more comfortable for a Chinese native speaker with such a display.

In some embodiments, this variation may be achieved through adaptation of various settings for language selection that may be built in to the structure of the app. Such setting commands are generally part of an API for a particular smartphone operating system, and will be known to those skilled in the art. The foreign language that may be used can be any language used by a large enough population that may need access to a particular phone tree, and may be especially useful if the language uses different characters than the Roman letters of English. For a phone tree in English, the foreign language representation may be in Chinese, Japanese, Korean, That, Vietnamese, Bahasa Indonesian, Hindi, Bengali, Telugu, Tamil, Urdu, Pashto, Farsi, Arabic, Hebrew, Ethiopian, Afrikaans, Russian, Ukrainian, Greek, Polish, Czech, German, Danish, Swedish, French, Italian, Spanish, Welsh, or Gaelic, among others.

Other embodiments of the invention may combine various elements of the two embodiments presented in other ways. For example, although the first embodiment shows building a Dialer Field by appending strings one at a time as the user goes through the phone tree menus, while the second embodiment shows the appending a single string representing an ensemble of selections, there is an alternative embodiment in which the user goes through the phone tree options one at a time but the final dialstring is created at the end of the process, appending a single string that represents the ensemble of choices.

Also, although the embodiments presented have illustrated the Dialer Field as if it were a separate register in a storage device within the smartphone, as a practical matter, the Dialer Field may in fact simply be the value for a string variable within the program, and the instructions for its assembly comprise lines of code in the software that revise or update the value of the string.

Likewise, the representation of the values to be added to the Dialer Field may simply exist as predetermined entries in the relational database that represents the IVR phone tree. The construction of a "Dialer Field" in this embodiment is therefore the assembly of a particular sequence of SQL commands that access the database as needed to assemble the selected options. Execution of the final SQL command assembles the dialstring based on the selections by the user and the database entries in the relational database representing the IVR Although the embodiments presented in this Application illustrate the invention by the creation of a dialstring using digits and commas (representing pauses), it will be known to those skilled in the art that many characters can be used to represent various actions in a dialstring. Dialstring characters may include:

0-9 #* (Conventional phone dialer input characters)
, (Pause—typically 2 seconds),
; (Return to beginning after dialing. Must be at the end of a dial string)
W (Wait for a tone),
@ (Wait for a 'quiet answer" before continuing)
! (Flash (go on-hook for ½ second).
T (To establish touch-tone dialing)
P (To establish pulse dialing)
R (To enter reverse mode)
70, (a string to disable call waiting), Other dialstring characters may be known to those skilled in the art.

Furthermore, although the embodiments illustrated in detail in this Application used phone trees in which the entries are generally single digits, some phone trees may require the user to enter several characters, such as a zip code, phone number, social security number, frequent flyer number, PIN, etc. In this case, the embodiments of the invention would operate essentially as already presented, except that the code implementing the method would be designed to accept the input of multiple digits or characters, and then appending the multi-digit input to the dialstring, instead of appending only a single digit.

It should also be noted that the embodiments here may be combined with an additional "search" function, so that the user could simply input a search string (such as "Kaplan lawsuit" for the USCIS phone tree), and have the related options (e.g. 1, 3, 1) appear using a suitable user interface, without requiring that the user go through the phone tree step by step.

VI. Embodiments using Remote Storage

In the embodiments presented so far, and as illustrated, for example, in FIG. 2, both the software code for the app 160 and the database 177 representing the IVR phone trees are present on internal storage 150 within the smartphone 100. However, smartphones are often engineered with multiple antennas for cellular phone connection and for local wi-fi Internet connections. It may therefore be practical to store the database representing the IVR phone trees on an external storage system at a remote location, or "in the cloud". "Cloud" data storage services are offered by companies such as Google Inc. of Mountain View, Calif. and Amazon Web Services of Seattle, Wash. (By "remote", it should be understood that the data storage site is simply at a physical location other than within the smartphone, and need not be "far from a center of population").

Figure 20:
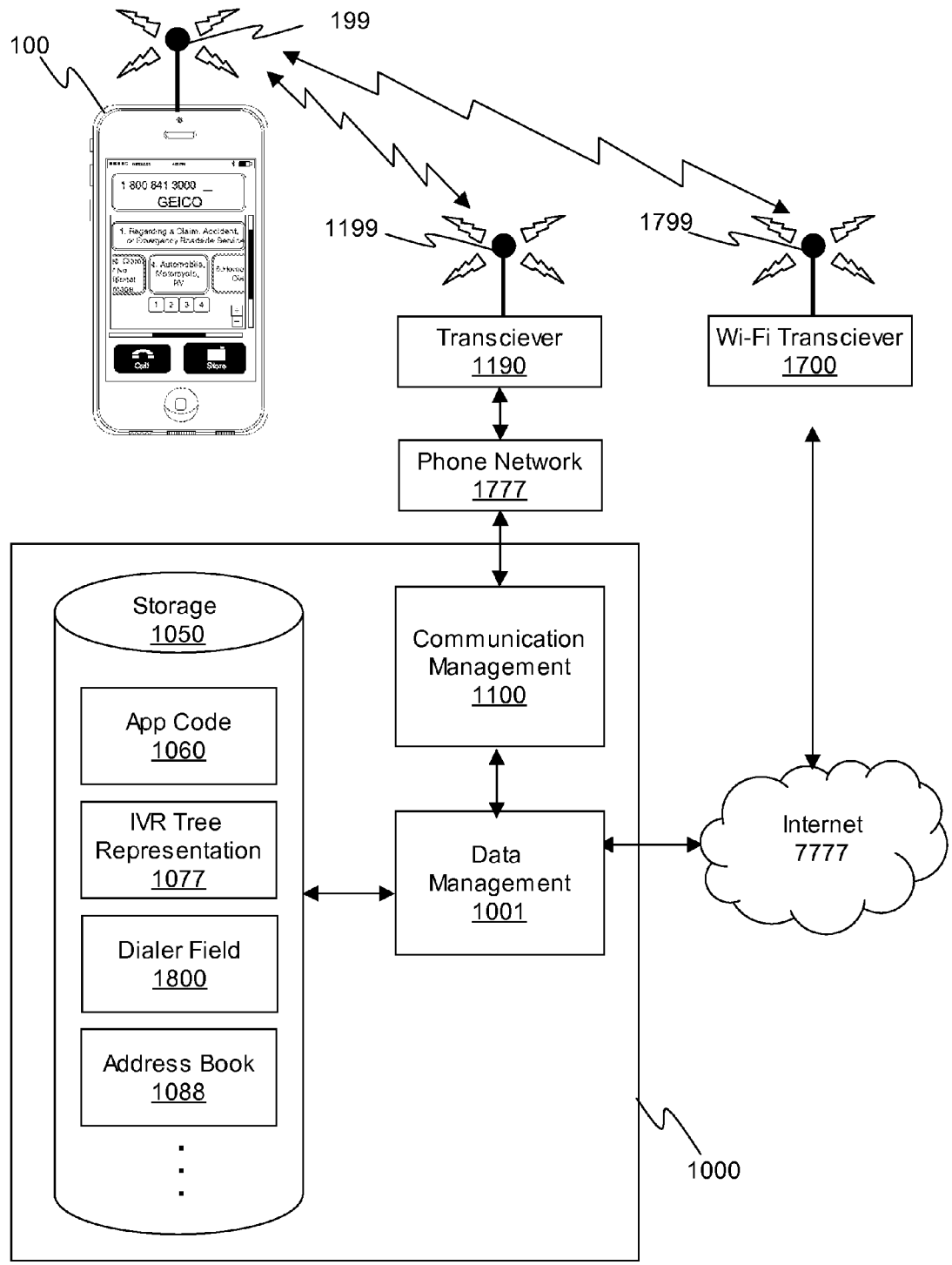
FIG. 20 presents a block diagram of the components of a smartphone configuration used to execute an embodiment of the method of the invention, in which the IVR database is stored using a remote storage device.

An embodiment of the invention using remote data storage is illustrated in FIG. 20. The smartphone 100 with one or more antennas 199 can connect wirelessly to local cellular phone transceivers 1190 comprising antennas 1199, or through various well-known wi-fi protocols (such as Bluetooth) to local transceivers 1700 comprising antennas 1799. These wireless connections in turn are linked to a remote data storage facility 1000, either through a conventional telephone system 1777, or through the Internet 7777. Note: Although the antennas 199 are shown in FIG. 20 as an external attachment to the smartphone 100, in practice, the antennas for most smartphones are built into the body of the phone.

Within the remote data storage facility 1000, storage devices 1050 such as disk drives, flash memory and the like store a database 1077 that represents one or more IVR phone trees. The remote storage devices 1050 may also store backup copies of the app code 1060, a copy of one or more dialer fields 1800 (either dynamically accessed during use, or more often as a reference of previously called numbers), a backup copy of an address book 1088, and other items that may be of use to the user, either for reference or as backup files for the data stored on the smartphone.

Within the remote facility 1000 will also be one or more data processing systems 1001, such as routers or computers, that serve to manage the data from the stored locations within the facility 1000 and coordinate their transmission. Transmission may occur through various telephone connections 1100, which will send data and receive instructions and requests for data through a telephone network 1777 and cellular transceivers 1190, which comprise one or more antennas 1199 providing connections to the smartphone 100 by means of cellular phone signals. The data processing systems 1001 may also provide a connection to the Internet 7777, which allows the user interact through a local wi-fi connection to a local transceiver 1700 comprising wi-fi antennas 1799, allowing instructions and requests for data from the facility 1000 to be sent and data received through the Internet.

Depending on the reliability of the user's connection, embodiments of the invention may be configured to store everything locally on the smartphone 100, share databases such as the IVR database between portions 177 on the smartphone 100 and portions 1077 in the remote facility 1000, or may store all IVR phone trees in the database 1077 in the remote facility 1000, accessing the data as needed.

VII. Embodiments on Other Phones

Although the embodiments described in this Application describe embodiments of the invention as implemented on a smartphone with a touchscreen display, it will be known to those skilled in the art that not all mobile phones (or even all smartphones) have a touchscreen display. In fact, many cellular phone products, such as those traditionally produced by Blackberry Ltd (formerly known as Research In Motion Ltd) of Waterloo, ON, Canada, comprise a display screen and a separate keypad for entry of characters. Most of the original cellular phones prior to the introduction of the iPhone by Apple Inc. in fact are constructed with distinct keypads and displays.

Embodiments of the invention in which the input and display are not combined in a touchscreen but are separate elements, with input achieved by pressing dedicated physical buttons in the keypad, may still function as well as the embodiments described here. The methods as presented are therefore still applicable, but each virtual "pressing" of a button in the disclosed methods will be replaced by the pressing of real buttons on the keypad, with the software code embodiment of the invention engineered to recognize the pressing of suitable keys or key combinations as indicative of the "selection" of an item shown in the display.

It will also be recognized by those skilled in the art that, although this has been described as being implemented by smartphone, any communication device comprising a display and a means for selecting items shown in the display may be used for both constructing dialstrings and, if a suitable telephone connection is also available, using the dialstring to make a phone call.

VIII. Embodiments on Computers

Although the embodiments disclosed so far comprise the use of a smartphone for exploring and selecting options from a database comprising a representation of one or more IVR phone trees, many computers connected to the Internet may also be used for telephone calls using, for example, Voice-over-Internet-Protocol (VoIP) services such as Skype™, offered by the Microsoft® Skype Division located in Luxembourg and Estonia. Using such a VoIP system, a normal desktop or laptop computer can become a telephone terminal for the transmission of both 2-way voice and video. Embodiments of the invention may therefore also be implemented by a computer, using the same steps of the methods previously disclosed, but in which the previously described steps that "display" various items on a smartphone display are replaced by steps "displaying" the same items on one or more display devices connected to the computer, and the previously described steps of "input" by pressing "virtual buttons" are replaced by steps in which the same input is provided using a keyboard, mouse, or other I/O device.

Figure 21:
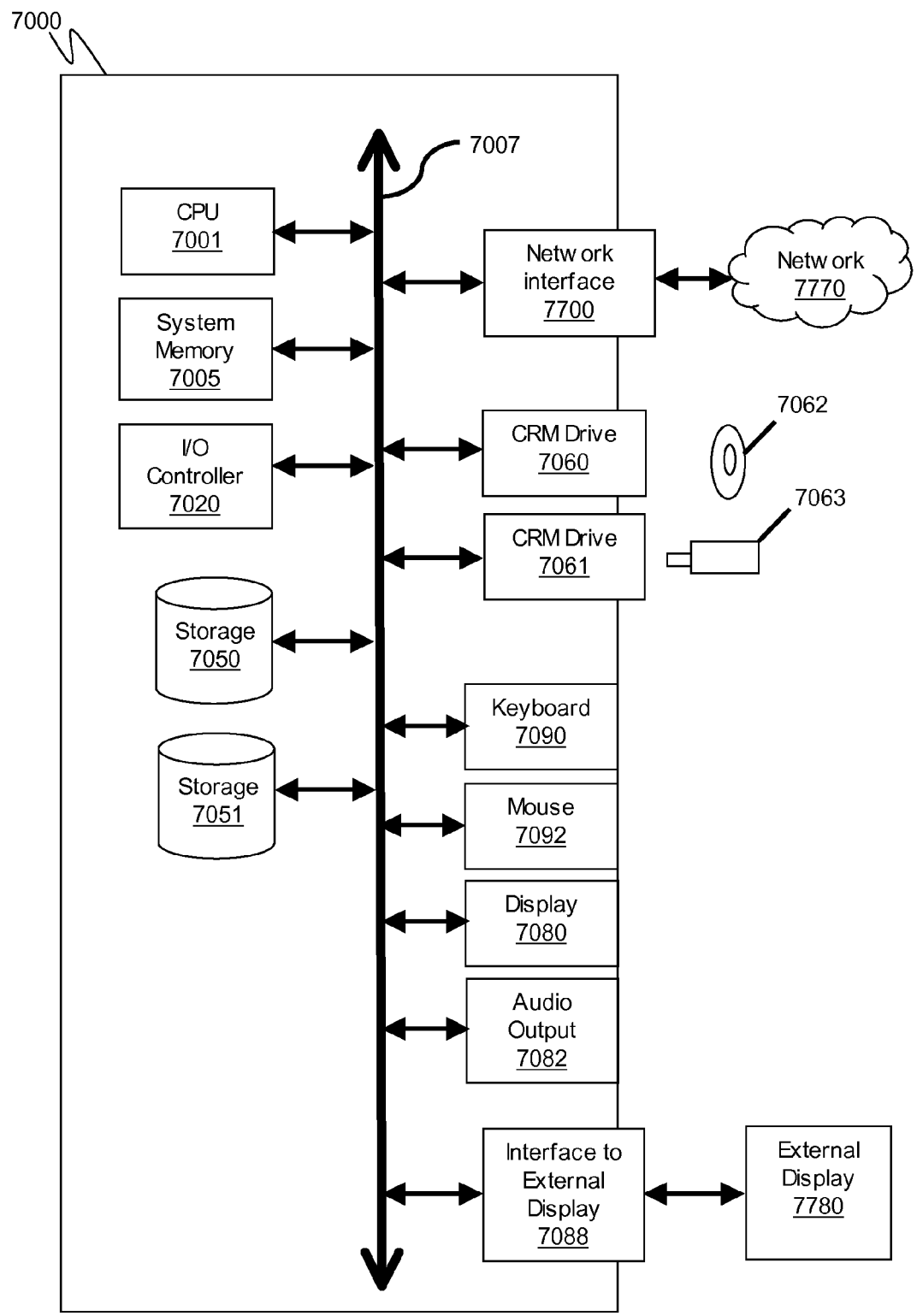
FIG. 21 presents a block diagram of the components of a computer system which may be used to execute an embodiment of the method of the invention.

FIG. 21 illustrates a block diagram of an exemplary computer system that can serve as a platform for portions of embodiments of the present invention. Computer code in programming languages such as, but not limited to, C, C++, C#, Java®, Javascript®, Objective C®, Boo, Lua, assembly, Fortran, APL, etc., and executed in operating environments such as Windows® and all its variants, Mac OS-X®, iOS®, Android®, Blackberry®, UNIX®, Linux®, etc., can be written and compiled into a set of computer or machine readable instructions that, when executed by a suitable computer or other microprocessor based machine, can cause the system to execute the method of the invention.

One embodiment of such a computer system 7000 comprises a bus 7007 which interconnects major subsystems of computer system 7000, which typically comprises: a central processing unit (CPU) 7001; a system memory 7005 (typically random-access memory (RAM), but which may also include read-only memory (ROM), flash RAM, or the like); an input/output (I/O) controller 7020; one or more data storage systems 7050, 7051 such as an internal hard disk drive or an internal flash drive or the like; a network interface 7700 to an external network 7770, such as the Internet, a fiber channel network, or the like; and one or more drives 7060, 7061 operative to receive computer-readable media (CRM) such as an optical disk 7062, compact-disc read-only memory (CD-ROM), compact discs (CDs), floppy disks, universal serial bus (USB) thumbdrives 7063, magnetic tapes, etc.

The computer system 7000 may also comprise: a keyboard 7090; a mouse 7092; and one or more various other I/O devices such as a trackball, an input tablet, a touchscreen device, an audio microphone and the like. These I/O devices may be internal to the system, as is found, for example, if the computer system 7000 is a laptop, or may be external to the system, as is found in typical desktop configurations. The computer system 7000 may also comprise a display device 7080, such as a cathode-ray tube (CRT) screen, a flat panel display or other display device; and an audio output device 7082, such as a speaker system. The computer system 7000 may also comprise an interface 7088 to an external display 7780, which may have additional means for audio, video, or other graphical display capabilities for remote viewing or analysis of results at an additional location.

Bus 7007 allows data communication between central processor 7000 and system memory 7005, which may comprise read-only memory (ROM) or flash memory, as well as random access memory (RAM), as previously noted. The RAM is generally the main memory into which the operating system and application programs are loaded. The ROM or flash memory can contain, among other code, the basic input/output system (BIOS) that controls basic hardware operation such as the interaction with peripheral components. Applications resident within computer system 7000 are generally stored on storage units 7050, 7051 comprising computer readable media (CRM) such as a hard disk drive (e.g., fixed disk) or flash drives.

Data can be imported into the computer system 7000 or exported from the computer system 7000 via drives that accommodate the insertion of portable computer readable media, such as an optical disk 7062, a USB thumbdrive 7063, and the like. Additionally, applications and data can be in the form of electronic signals modulated in accordance with the application and data communication technology when accessed from a network 7770 via network interface 7700. The network interface 7700 may provide a direct connection to a remote server via a direct network link to the Internet via an Internet PoP (Point of Presence). The network interface 7700 may also provide such a connection using wireless techniques, including a digital cellular telephone connection, a Cellular Digital Packet Data (CDPD) connection, a digital satellite data connection or the like.

Many other devices or subsystems (not shown) may be connected in a similar manner (e.g., document scanners, digital cameras, etc.). Conversely, all of the devices shown in FIG. 21 need not be present to practice the present disclosure. In some embodiments, the devices and subsystems can be interconnected in different ways from that illustrated in FIG. 21.

Code representing software instructions to implement embodiments of the present invention can be stored on one or more computer-readable storage media such as: the system memory 7005, internal storage units 7050 and 7051, an optical disk 7062, a USB thumbdrive 7063, one or more floppy disks, and the like. The operating system provided for computer system 7000 may be any one of a number of operating systems, such as UNIX®, Linux®, MS-DOS®, MS-WINDOWS®, OS-X® or another known operating system.

Moreover, regarding the signals described herein, those skilled in the art will recognize that a signal can be directly transmitted from one block to another, between single blocks or multiple blocks, or can be modified (e.g., amplified, attenuated, delayed, latched, buffered, inverted, filtered, or otherwise modified) by one or more of the blocks. Furthermore, the computer as described above may be constructed as any one of, or combination of, computer architectures, such as a tower, a desktop, a laptop, a workstation, or a mainframe (server) computer. The computer system may also be any one of a number of other portable computers or microprocessor based devices such as a mobile phone, a smartphone, a tablet computer, an iPad®, an e-reader, or wearable computers such as smart watches, intelligent eyewear and the like.

For the embodiments of the invention as presented in this Application using such a computer 7000, software code representing the equivalent of the app and databases comprising representations if IVR phone trees may be read from storage devices 7050 or 7051 within the computer system 7000, or from CRM such as an optical disk 7062 or USB thumbdrive 7063, and executed using the CPU 7001 and system memory 7005. The options as previously described as being displayed using the touchscreen display 230 may now be presented on either an internal display 7080 or an external display 7780 connected by means of an interface 7088, and the user may make "selections" using a keyboard 7090 and/or mouse 7092 synchronized with a graphical user interface (GUI) constructed within the software to allow coordination of the options shown on the available displays 7080 or 7780.

IX. Hardware and Software

Accordingly, embodiments of the present invention may be encoded in suitable hardware and/or in software (including firmware, resident software, microcode, etc.). Furthermore, embodiments of the present invention may take the form of a computer program product on a non-transitory computer readable storage medium having computer readable program code comprising instructions encoded in the medium for use by or in connection with an instruction execution system. Non-transitory computer readable media on which instructions are stored to execute the methods of the invention are therefore in turn embodiments of the invention as well. In the context of this Application, a computer readable medium may be any medium that can contain, store, communicate, propagate, or transport the program for use by or in connection with the instruction execution system, apparatus, or device.

The computer readable medium may be, for example but not limited to, an electronic, magnetic, optical, electromagnetic, infrared, or semiconductor system, apparatus, or device. More specific examples (a non-exhaustive list) of a computer readable media would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

X. Limitations

With this Application, several embodiments of the invention, including the best mode contemplated by the inventors, have been disclosed. It will be recognized that, while specific embodiments may be presented, elements discussed in detail only for some embodiments may also be applied to others.

While specific materials, designs, configurations, platforms and process steps have been set forth to describe this invention and the preferred embodiments, such descriptions are not intended to be limiting. Modifications and changes may be apparent to those skilled in the art, and it is intended that this invention be limited only by the scope of the appended claims.

What is claimed is:

1. An electronic smartphone implemented method for creating a telephone dialstring, comprising the steps of:
   accessing, by a computer within the smartphone, an electronic relational database comprising representations of telephone numbers and phone tree options, in which
      the phone tree options are associated with the telephone numbers represented in the relational database;
   accepting input data to select at least one of the represented telephone numbers;
   accessing, based on the input, a graphical file corresponding to the phone tree;
   displaying on a display device of the smartphone the graphical file corresponding to the phone tree;
   receiving a data signal corresponding to the selection of at least one of the set of phone tree options
      generated by the touching of a position on a touchscreen that is displaying at least a portion of the graphical file; and
   appending, by a computer within the smartphone, a bitstring associated with the selected phone tree option to a string comprising bits representing the selected telephone number to create a modified dialstring.

2. The method of claim 1, in which
   the electronic relational database is stored using non-transitory electronic storage devices within the smartphone.

3. The method of claim 1, in which
   the electronic relational database is stored using non-transitory electronic storage devices that are outside the smartphone.

4. The method of claim 3, in which
the electronic relational database stored outside the smartphone is accessed by the smartphone by means of an Internet connection.

5. The method of claim 3, in which
the electronic relational database stored outside the smartphone is accessed by the smartphone by means of a wireless connection.

6. The method of claim 1, in which
the dialstring is represented by a string variable.

7. The method of claim 1, in which
the graphical file corresponding to the phone tree comprises information about the phone tree in a language that is different from the language used in the phone tree.

8. The method of claim 7, in which
the language that is different from the language used in the phone tree is selected from the group consisting of:
Mandarin Chinese, Cantonese, Taiwanese, Japanese, Korean, Thai, Vietnamese, Bahasa Indonesian, Hindi, Bengali, Telugu, Tamil, Urdu, Pashto, Farsi, Arabic, Hebrew, Ethiopian, Afrikaans, Russian, Ukrainian, Greek, Polish, Czech, German, Danish, Swedish, French, Italian, Spanish, Welsh, and Gaelic; and
the language used in the phone tree is English.

9. The method of claim 7, in which
the language that is different from the language used in the phone tree is English, and
the language used in the phone tree is Spanish.

10. An electronic smartphone implemented method for creating a telephone dialstring, comprising the steps of:
accessing, by a computer within the smartphone, an electronic relational database comprising representations of telephone numbers and phone tree options,
in which the phone tree options are associated with the telephone numbers represented in the relational database;
accepting input data to select at least one of the represented telephone numbers;
displaying on a display device of the smartphone a set of phone tree options associated with the selected telephone number, in which
the displayed options are presented in a language different than the language used in the phone tree;
accepting input data to select at least one of the set of phone tree options; and
appending, by a computer within the smartphone, a bitstring associated with the selected phone tree option to a string comprising bits representing the selected telephone number to create a modified dialstring.

11. The method of claim 10, in which
the language that is different from the language used in the phone tree is selected from the group consisting of:
Mandarin Chinese, Cantonese, Taiwanese, Japanese, Korean, Thai, Vietnamese, Bahasa Indonesian, Hindi, Bengali, Telugu, Tamil, Urdu, Pashto, Farsi, Arabic, Hebrew, Ethiopian, Afrikaans, Russian, Ukrainian, Greek, Polish, Czech, German, Danish, Swedish, French, Italian, Spanish, Welsh, and Gaelic; and
the language used in the phone tree is English.

12. The method of claim 10, in which
the language that is different from the language used in the phone tree is English, and
the language used in the phone tree is Spanish.

13. An electronic smartphone implemented method for creating a telephone dialstring, comprising the steps of:
accessing, by a computer within the smartphone, an electronic relational database comprising representations of:
telephone numbers, phone tree options and images, in which
the phone tree options are associated with at least one telephone number represented in the relational database, and
at least one image is associated with at least one telephone number;
accepting input data to select at least one of the represented telephone numbers that has an associated image;
displaying on a display device of the smartphone the at least one image associated with the selected telephone number;
displaying on a display device of the smartphone a set of phone tree options associated with the selected telephone number;
accepting input data to select at least one of the set of phone tree options; and
appending, by a computer within the smartphone, a bitstring associated with the selected phone tree option to a string comprising bits representing the selected telephone number to create a modified dialstring.

14. The method of claim 13, in which
the at least one image is a corporate logo.

15. An electronic smartphone implemented method for creating a stored telephone dialstring, comprising the steps of:
accessing, by a computer within the smartphone, an electronic relational database comprising representations of telephone numbers and phone tree options, in which
the phone tree options are associated with the telephone numbers represented in the relational database;
accepting input data to select at least one of the represented telephone numbers;
displaying on a display device of the smartphone a set of phone tree options associated with the selected telephone number;
accepting input data to select at least one of the set of phone tree options; and
appending, by a computer within the smartphone, a bitstring associated with the selected phone tree option to a string comprising bits representing the selected telephone number to create a modified dialstring; and
storing the modified dialstring using a non-transient electronic data storage device.

16. The method of claim 15, in which
the electronic relational database comprising representations of telephone numbers and phone tree options is stored at a remote location; and
the step of accessing the electronic relational database is implemented using a wireless connection.

\* \* \* \* \*